United States Patent
Hasegawa et al.

(10) Patent No.: US 9,582,476 B2
(45) Date of Patent: Feb. 28, 2017

(54) IMAGE PROCESSING DEVICE

(71) Applicant: BROTHER KOGYO KABUSHIKI KAISHA, Nagoya, Aichi (JP)

(72) Inventors: Tomohiko Hasegawa, Okazaki (JP); Masaki Kondo, Toyoake (JP); Ryohei Ozawa, Nagoya (JP); Yoshiyuki Tanaka, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 41 days.

(21) Appl. No.: 14/640,455

(22) Filed: Mar. 6, 2015

(65) Prior Publication Data
US 2015/0254801 A1 Sep. 10, 2015

(30) Foreign Application Priority Data
Mar. 6, 2014 (JP) .................................. 2014-044334

(51) Int. Cl.
*G06F 17/00* (2006.01)
*G06F 17/21* (2006.01)
(Continued)

(52) U.S. Cl.
CPC .............. *G06F 17/211* (2013.01); *G06K 9/00* (2013.01); *H04N 1/00* (2013.01)

(58) Field of Classification Search
None
See application file for complete search history.

(56) References Cited

U.S. PATENT DOCUMENTS

| 7,406,458 B1 * | 7/2008 | Carson .............. G06F 17/30864 |
| 2001/0009009 A1 * | 7/2001 | Iizuka ................... G06F 17/274 715/259 |

(Continued)

FOREIGN PATENT DOCUMENTS

| JP | H05-94511 A | 4/1993 |
| JP | H11-25283 A | 1/1999 |

(Continued)

OTHER PUBLICATIONS

Automatic Line Feeding according to Screen Size!, Document File Displayed in Reader-Friendly Manner on Smartphone, Layout Rearranging Technology "GT-Layout", Starting Service for Online Storage Tool "Dropbox", New Development, May 30, 2012, Fujifilm Corporation, together with partial translation.

*Primary Examiner* — Ryan R Yang
(74) *Attorney, Agent, or Firm* — Scully, Scott, Murphy & Presser, PC

(57) ABSTRACT

An image processing device may acquire original image data representing an original image including M lines of original character strings, and combine M items of original character string image data representing the M lines of original character strings so as to create target character string image data representing one line of target character string. The image processing device may divide the target character string image data so as to create N items of divided character string image data representing N lines of divided character strings into which the one line of target character string is divided, and create output image data representing the N lines of divided character strings by using the N items of divided character string image data. A number of characters of a leading line of divided character string may be different from a number of characters of a leading line of original character string.

19 Claims, 12 Drawing Sheets

(51) Int. Cl.
*G06K 9/00* (2006.01)
*H04N 1/00* (2006.01)

(56) References Cited

U.S. PATENT DOCUMENTS

| | | | |
|---|---|---|---|
| 2013/0298015 A1 | 11/2013 | Ogura | |
| 2014/0053050 A1 | 2/2014 | Yano | |
| 2014/0297276 A1* | 10/2014 | Tachimori | ............... G06F 17/24 |
| | | | 704/235 |
| 2015/0081272 A1* | 3/2015 | Kamatani | ............... G10L 15/18 |
| | | | 704/2 |

FOREIGN PATENT DOCUMENTS

| | | |
|---|---|---|
| JP | 2000-137801 A | 5/2000 |
| JP | 2005-223824 A | 8/2005 |
| JP | 2010-183484 A | 8/2010 |
| JP | 2011-242987 A | 12/2011 |
| JP | 2012-108750 A | 6/2012 |
| JP | 2012-216038 A | 11/2012 |
| JP | 2012-230623 A | 11/2012 |
| JP | 2012-2230623 A | 11/2012 |

* cited by examiner

FIG. 8
(Case A)
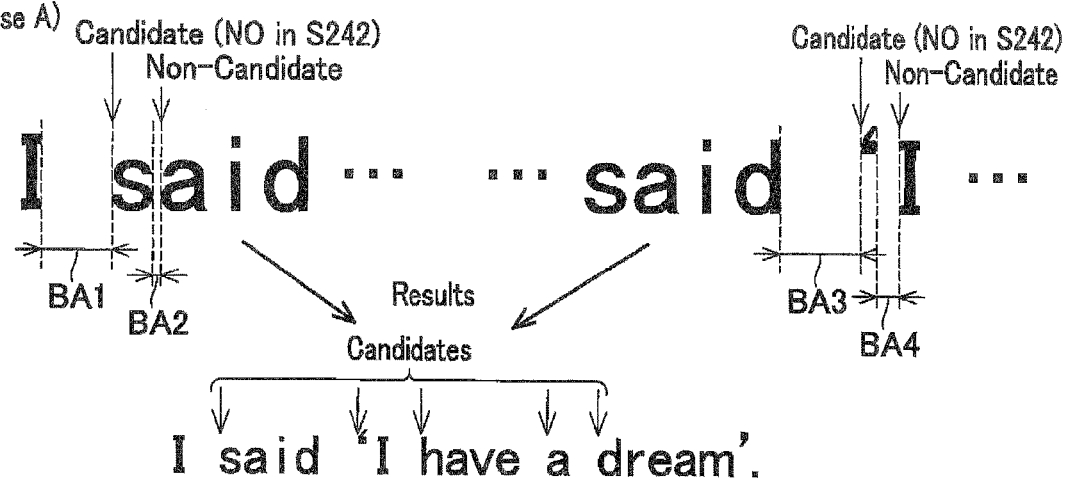
(Case B)
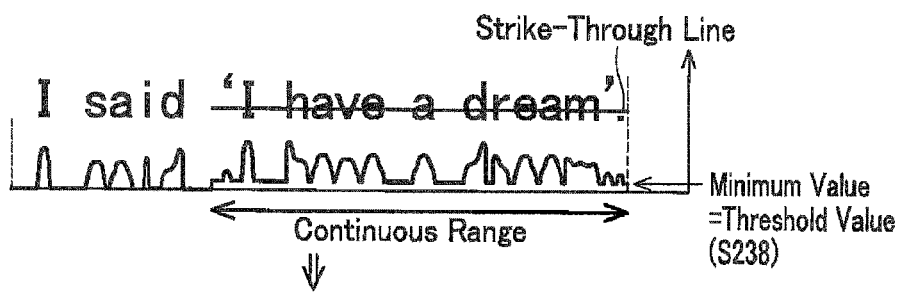
Determine Middle Blank Area And Adjacent Area Based on Threshold Value Greater than 0
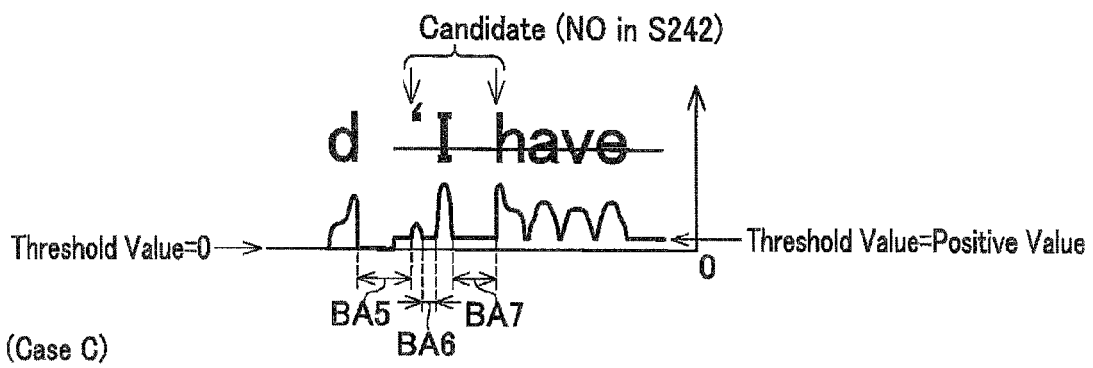
(Case C)
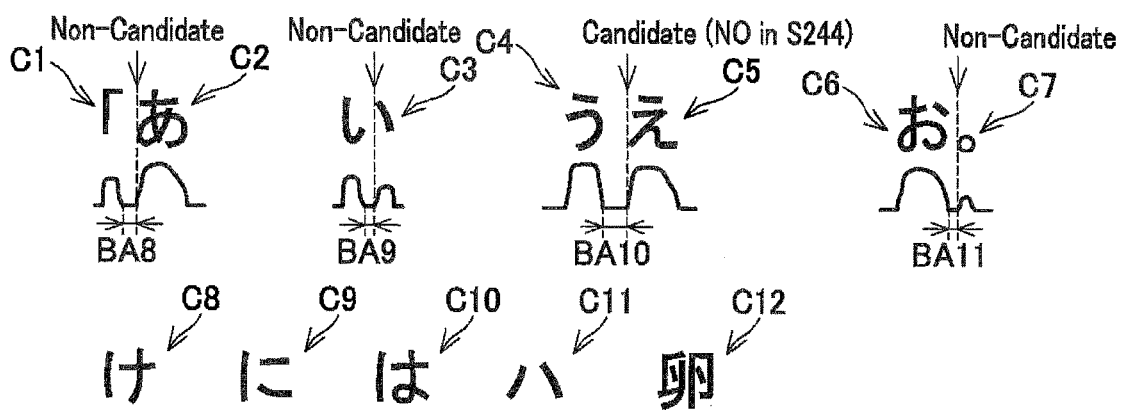

IMAGE PROCESSING DEVICE

CROSS-REFERENCE TO RELATED APPLICATIONS

This application claims priority to Japanese Patent Application No. 2014-044334, filed on Mar. 6, 2014, the contents of which are hereby incorporated by reference into the present application.

TECHNICAL FIELD

In the present specification, an image processing device is taught which, by using original image data representing an original image that includes a plurality of characters, creates output image data representing an output image that includes the plurality of characters re-located in a state different from the original image.

DESCRIPTION OF RELATED ART

A system comprising a mobile telephone and a document image server is known. The document image server creates a position coordinate list indicating a position of each of a plurality of characters included in a document image. The mobile telephone acquires, from the document image server, an image file representing the document image, and the position coordinate list. Then, by re-locating the plurality of characters using the position coordinate list, the mobile telephone can display an area in the document image while scrolling, or can enlarge or reduce the area and display it.

SUMMARY

In the above technique, when the plurality of characters is to be re-located, data (i.e., the position coordinate list) indicating the position of each character is used. In the present specification, a technique is provided in which data indicating a position of each character does not need to be used when a plurality of characters is to be re-located.

An image processing device may comprise: a processor; and a memory storing computer-readable instructions. The computer-readable instructions, when executed by the processor, may cause the image processing device to: acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction; combine M items of original character string image data obtained from the original image data so as to create target character string image data, the M items of original character string image data representing the M lines of original character strings, and the target character string image data representing one line of target character string in which the M lines of original character strings are combined linearly along the first direction; divide the target character string image data so as to create N items of divided character string image data, the N being an integer of 2 or more, and the N items of divided character string image data representing N lines of divided character strings into which the one line of target character string is divided; and create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings.

A control method and computer-readable instructions for implementation of the image processing device, and a non-transitory computer-readable recording medium in which the computer-readable instructions are stored, are also novel and useful.

BRIEF DESCRIPTION OF THE DRAWINGS

FIG. 8 shows specific examples of the division candidate position determination process;

EMBODIMENT (First Embodiment)
(Configuration of Communication System 2)

Figure 1:
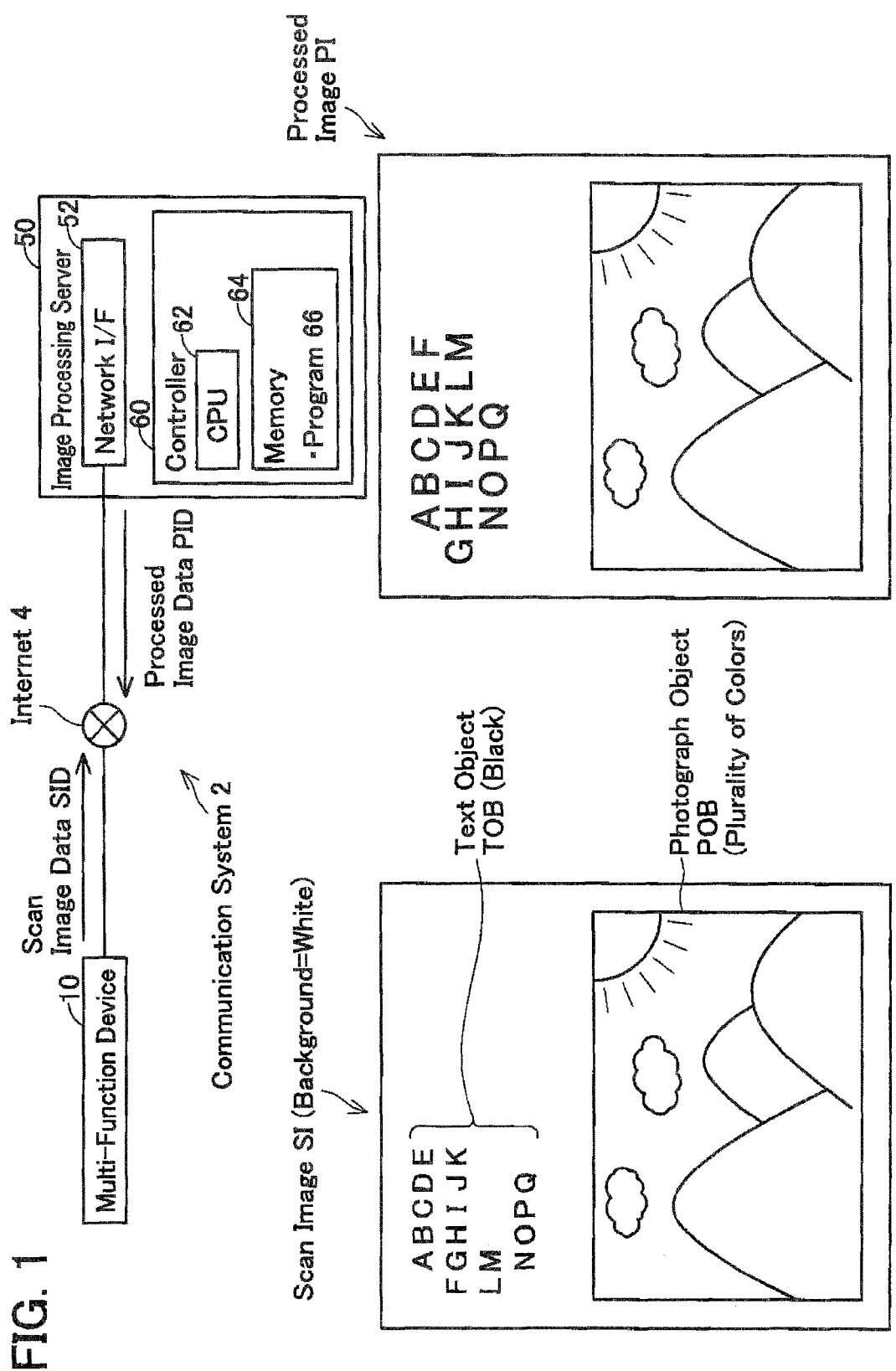
FIG. 1 shows the configuration of a communication system.

As shown in FIG. 1, a communication system 2 comprises a multi-function device 10 and an image processing server 50. The multi-function device 10 and the image processing server 50 are communicably connected with one another via the Internet 4. The multi-function device 10 is a peripheral apparatus (i.e., a peripheral apparatus of a PC (abbreviation of Personal Computer) or the like; not shown) capable of executing various functions including a print function, scan function, copy function, FAX function, etc. The image processing server 50 is a server provided on the Internet 4 by a vendor of the multi-function device 10.

(Summary of Processes Executed by Multi-Function Device 10)

The copy function which can be executed by the multi-function device 10 is classified into a monochrome copy function and a color copy function. However, in the present embodiment, description will focus on the color copy function. The color copy function is classified into a normal color copy function and a character enlargement color copy function. When an execution instruction of either color copy function is given by a user, the multi-function device 10 first executes a color scan of a sheet representing an image of a scan target (called "scan target sheet" below), creating scan image data SID. The scan image data SID is RGB bitmap data having a multi-gradation (e.g., 256 gradations).

A scan image SI (i.e., an image represented on the scan target sheet) represented by the scan image data SID has a white background, and includes a text object TOB and a photograph object POB. The text object TOB includes four lines of character strings configured by a plurality of black characters "A to Q". Moreover, the color of the characters may be other than black (e.g., red). The photograph object POB does not include characters, but includes a photograph configured by a plurality of colors.

Moreover, in the drawings of the present embodiment, for convenience, the character strings configuring the text object TOB are represented by the alphabets "A to Q" located in a regular order. However, in fact, the character strings configure a sentence. In each character string (i.e., one line of character string), the sentence proceeds from the left side to the right side in the horizontal direction of the scan image SI. Further, in the four lines of character strings "A to Q", the sentence proceeds from the upper side to the lower side in the vertical direction of the scan image SI. Moreover, in any of the images below (e.g., a processed image PI, to be described), the direction in which a plurality of characters configuring one line of character string are aligned, and a direction orthogonal to that direction, are called "horizontal direction" and "vertical direction", respectively. Further, since the sentence proceeds from the left side toward the right side, the left end in the horizontal direction, and the right end in the horizontal direction are called "front end" and "rear end", respectively.

Further, an indented blank area is formed at a front end side (i.e., left side) beyond the character string "A to E", which is a leading line among the four lines of character strings "A to Q" configuring the text object TOB. Further, there is a line break at the character string "LM", which is a third line among the four lines of character strings "A to Q", and an indented blank area is formed at a front end side beyond the character string "N to Q", which is a last line. That is, one paragraph is configured by the leading three lines of character strings "A to M" among the four lines of character strings "A to Q", and another one paragraph is configured by the last line of character string "N to Q".

If the normal color copy function execution instruction is given by the user, the multi-function device 10 uses the scan image data SID to print an image onto a sheet (called "print target sheet" below) in accordance with a copy magnification set by the user. For example, if the copy magnification is equal magnification, the multi-function device 10 prints onto the print target sheet an image having the same size as the image represented on the scan target sheet. Further, for example, if the copy magnification is a magnification indicating enlargement of the image, the multi-function device 10 prints onto the print target sheet an image having a larger size than the image represented on the scan target sheet. In this case, for example, an image represented on an A4 size scan target sheet is enlarged, and is printed onto an A3 size print target sheet. As a result, an image in which an enlargement of both of the two objects TOB, POB are represented is printed onto the print target sheet.

On the other hand, if the character enlargement color copy function execution instruction is given by the user, the multi-function device 10 sends the scan image data SID to the image processing server 50 via the Internet 4. Thus, the multi-function device 10 receives processed image data PID from the image processing server 50 via the Internet 4, and prints the processed image PI represented by the processed image data PID onto the print target sheet. In particular, the multi-function device 10 prints the processed image PI onto a print target sheet having the same size (e.g., A4 size) as the scan target sheet.

In the processed image PI, the text object TOB is represented enlarged in comparison with the scan image SI, and the photograph object POB is not enlarged. Consequently, even in the case where the size of each character in the scan image SI is small, the size of each character in the processed image PI increases, and consequently the user can easily recognize each character in the processed image PI. Further, the number of characters (i.e., "6") of the character string "A to F" in the leading line in the character strings "A to Q" in the processed image PI is different from the number of characters (i.e., "5") of the character string "A to E" in the leading line in the character strings "A to Q" in the scan image SI. Thus, the number of lines (i.e., three lines) of the character strings in the processed image PI is different from the number of lines (i.e., four lines) of the character strings in the scan image SI. However, the relationship of the two paragraphs in the processed image PI is the same as the relationship of the two paragraphs in the scan image SI. That is, in the three lines of character strings "A to Q" in the processed image PI, an indented blank area is formed further to the front than the front end side (i.e., left side) of the leading line of character string "A to F", there is a line break at the second line of character string "G to M", and an indented blank area is formed further to the front than the front end side of the last line of character string "N to Q". That is, one paragraph is configured by the leading two lines of character string "A to M" among the three lines of character strings "A to Q", and another one paragraph is configured by the last line of character string "N to Q".

(Configuration of Image Processing Server 50)

The image processing server 50 executes image processing on the scan image data SID received from the multi-function device 10, creating the processed image data PID, and sends the processed image data PID to the multi-function device 10. The image processing server 50 comprises a network interface 52 and a controller 60. The network interface 52 is connected with the Internet 4. The controller 60 comprises a CPU 62 and a memory 64. The CPU 62 is a processor that executes various processes (i.e., the processes of FIG. 2, etc.) in accordance with a program 66 stored in the memory 64.

Figure 2:
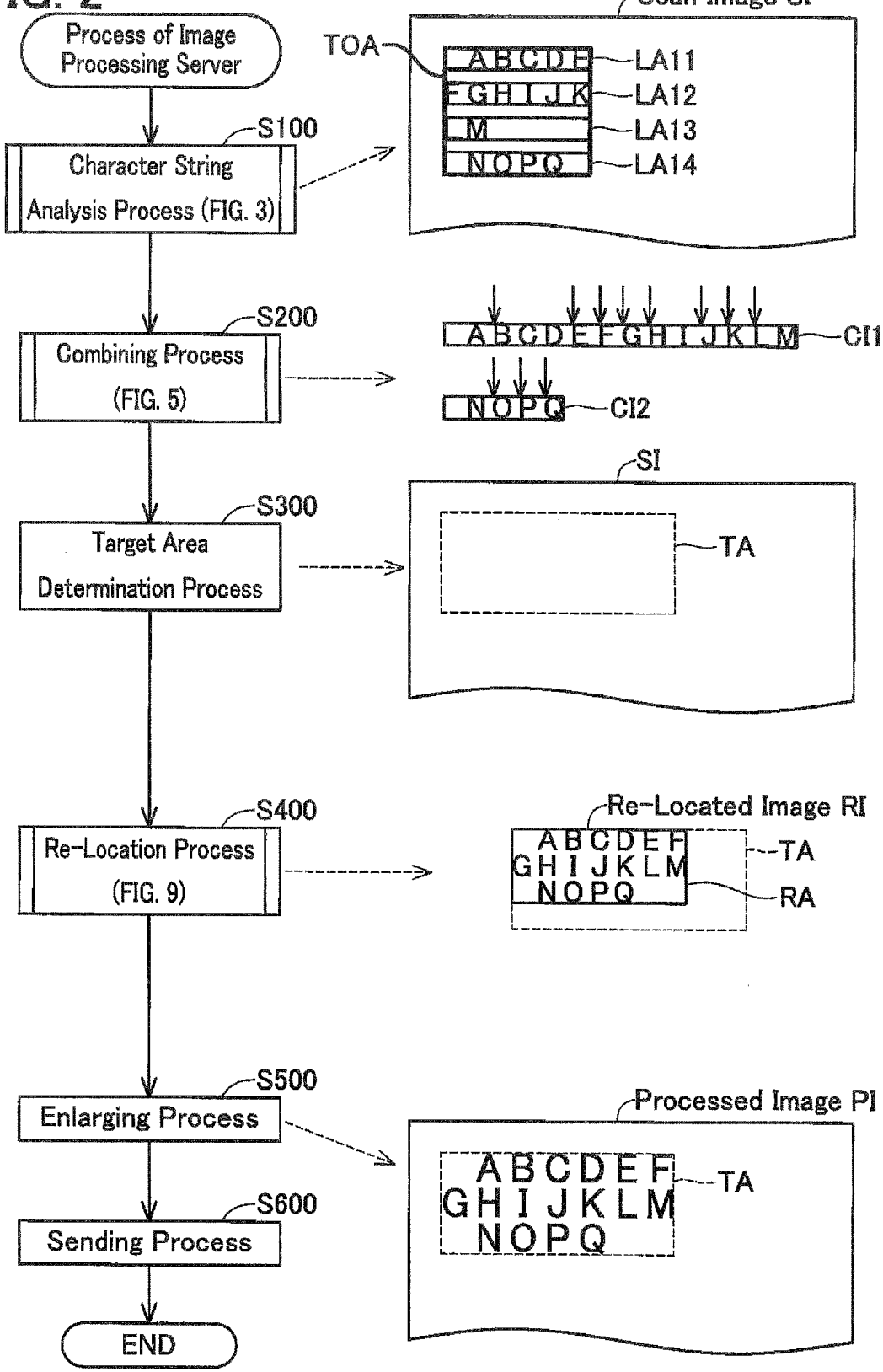
FIG. 2 shows a flowchart of a process of an image processing server.

(Processes Executed by Image Processing Server 50; FIG. 2)

Next, the contents of processes executed by the CPU 62 of the image processing server 50 will be described with reference to FIG. 2. When receiving the scan image data SID from the multi-function device 10 via the Internet 4, the CPU 62 starts the processes of FIG. 2.

In S100, the CPU 62 executes a character string analysis process (see FIG. 3, to be described) for determining a text object area TOA including the four lines of character strings "A to Q" in the scan image SI. Then, the CPU 62 determines four strip-shaped areas LA11 to LA14 including the four lines of character strings "A to Q" in the text object area TOA.

In S200, the CPU 62 executes a combining process (see FIG. 5, to be described) for creating two items of combined image data representing two combined images CI1, CI2. The combined image CI1 includes one line of character string "A to M", in which the three lines of character strings included in the three strip-shaped areas LA11 to LA13 are combined (i.e., "connected" or "coupled") linearly along a horizontal direction. Further, the combined image CI2 includes the one line of character string "N to Q" included in the one strip-shaped area LA14. Despite not including a character string in which a plurality of lines of character strings are combined, for convenience the combined image CI2 is called a "combined image". The combined image CI1 includes the character string "A to M" configuring one paragraph, and the combined image CI2 includes the character string "N to Q" configuring another paragraph. That is, for each one paragraph included in the text object area TOA, one item of combined image data representing one combined image is created.

In S300, the CPU 62 executes a target area determination process for determining a target area TA in the scan image SI. Specifically, the CPU 62 first determines a space area having an upper left corner matching an upper left corner of the text object area TOA. The space area has a size larger than the size (i.e., area) of the text object area TOA, and does not overlap with another object area (e.g., an object area including the photograph object POB). Then, the CPU 62 determines the target area TA within the space area having an aspect ratio equal to the aspect ratio of the space area. Here, the size (i.e., area) of the target area TA is, at maximum, a size equal to or below α times the size (i.e., area) of the text object area TOA (α being a value greater than 1, for example, 1.4 times). The position of the target area TA is set such that the upper left corner of the target area TA matches the upper left corner of the text object area TOA. Usually, the aspect ratio of the target area TA is different from the aspect ratio of the text object area TOA. The target area TA in the scan image SI matches the target area TA in the processed image PI (see the processed image PI of S500). Consequently, the process of S300 is equivalent to the process for determining the target area TA in the processed image PI. The target area TA in the processed image PI is an area in which the enlarged representation of the character strings "A to Q" is to be located.

In S400, the CPU 62 executes a re-location process (see FIG. 9, to be described) for determining a re-located area RA. Then, by re-locating the plurality of characters "A to Q" in the re-located area RA by using the two items of combined image data representing the two combined images CI1, CI2, the CPU 62 creates re-located image data representing a re-located image RI.

In S500, the CPU 62 enlarges the re-located image data representing the re-located image RI, so as to create enlarged image data. Then, using the enlarged image data, the CPU 62 creates the processed image data PID representing the processed image PI. In the processed image PI, each character is represented as an enlargement, but the processed image data PID has the same number of pixels as the scan image data SID.

In S600, the CPU 62 sends the processed image data PID to the multi-function device 10 via the Internet 4. Thus, the processed image PI represented by the processed image data PID is printed onto the target print sheet.

Figure 3:
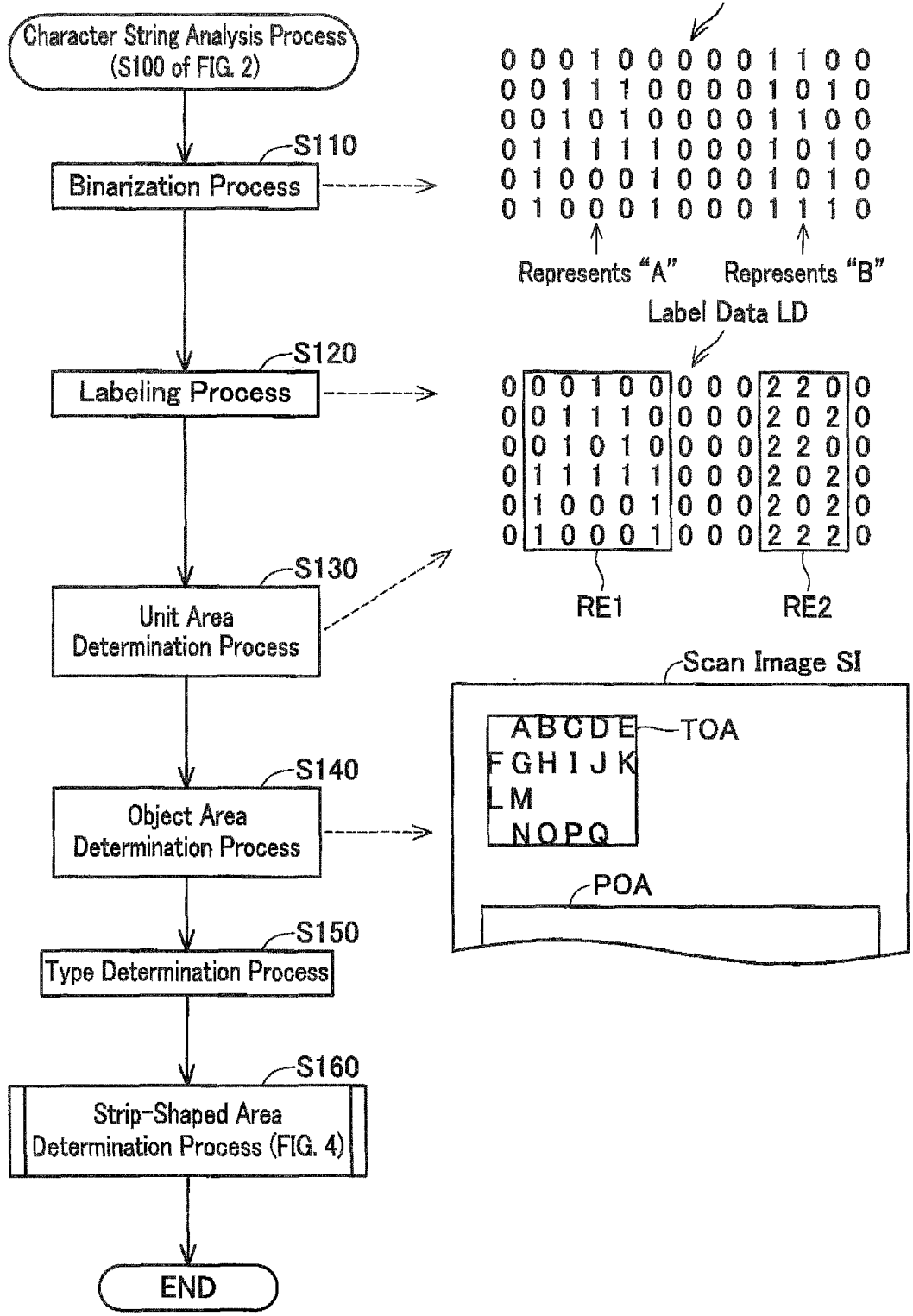
FIG. 3 shows a flowchart of a character string analysis process.

(Character String Analysis Process; FIG. 3)

Next, the contents of the character string analysis process executed in S100 of FIG. 2 will be described with reference to FIG. 3. In S110, the CPU 62 executes a binarization process on the scan image data SID, so as to create binary data BD (only a part is shown in FIG. 3) having the same number of pixels as the scan image data SID. The CPU 62 first determines background color of the scan image SI (white in the present embodiment) by using the scan image data SID. Specifically, the CPU 62 creates a histogram showing distribution of the frequency of pixel values of the plurality of pixels in the scan image data SID. Then, using the histogram, the CPU 62 determines the background color by identifying a pixel value having the highest frequency (called "most frequent pixel value" below). Next, in a case where a pixel value of a pixel in the scan image data SID matches the most frequent pixel value, the CPU 62 assigns "0" as a pixel value of a pixel in the binary data BD present at a position corresponding to the pixel in the scan image data SID. On the other hand, in a case where a pixel value of a pixel in the scan image data SID does not match the most frequent pixel value, the CPU 62 assigns "1" as a pixel value of a pixel in the binary data BD present at a position corresponding to the pixel in the scan image data SID. As a result, in the binary data BD, each pixel representing each character (e.g., "A", "B") included in the text object TOB shows the pixel value "1"; each pixel representing the photograph object POB shows the pixel value "1"; and each other pixel (i.e., pixels representing the background) shows the pixel value "0". Moreover, below, a pixel showing the pixel value "1", and a pixel showing the pixel value "0" in the binary data BD are called "ON pixel" and "OFF pixel", respectively.

In S120, the CPU 62 executes a labeling process on the binary data BD created in S110, so as to create label data LD (only a part is shown in FIG. 3) having the same number of pixels as the binary data BD. Specifically, the CPU 62 separates the plurality of ON pixels in the binary data BD into two or more ON pixel groups, and assigns a differing pixel value (e.g., "1", "2", etc.) to each of the two or more ON pixel groups. One ON pixel group is configured by two or more ON pixels adjacent to one another. That is, in a case where one or more ON pixels are included among eight adjacent pixels that are adjacent to one ON pixel which is a target of the labeling process, the CPU 62 classifies (i.e., groups) the one target ON pixel and the one or more ON pixels among the eight adjacent pixels as the same ON pixel group. The CPU 62 determines the two or more ON pixel groups by sequentially executing the grouping of each ON pixel while changing the ON pixel which is the target of the labeling process. For example, in the label data LD of FIG. 3, the pixel value "1" is assigned to each ON pixel representing the character "A" (i.e., one ON pixel group), and the pixel value "2" is assigned to each ON pixel representing the character "B" (i.e., another one ON pixel group).

In S130, using the label data LD created in S120, the CPU 62 determines a unit area corresponding to each ON pixel group above. Each unit area is a rectangular area circumscribing one corresponding ON pixel group. For example, in the case where the label data LD of FIG. 3 is used, the CPU 62 determines the unit area circumscribing the ON pixel group to which the pixel value "1" is assigned (i.e., the unit area corresponding to the character "A"), and the unit area circumscribing the ON pixel group to which the pixel value "2" is assigned (i.e., the unit area corresponding to the character "B"). More specifically, from among the scan image SI, the CPU 62 determines seventeen unit areas corresponding to the seventeen characters "A" to "Q", and one unit area corresponding to the one photograph object POB (i.e., determines eighteen unit areas in total). The determination of the unit areas above is executed by storing the position of each pixel configuring each corner of the unit area in the memory 64. However, below, in the description relating to "determination of area (or position)", a description relating to storing the position of the pixels in the memory 64 is omitted.

In S140, the CPU 62 determines an object area in the scan image SI by using the unit areas determined in S130. Specifically, the CPU 62 classifies the eighteen unit areas into a plurality of unit area groups, and determines each object area corresponding to each unit area group. One unit area group is configured by one or more unit areas present in the vicinity. If a distance (i.e., number of pixels) between two unit areas is less than a predetermined distance, the CPU 62 classifies the two unit areas as the same unit area group. The predetermined distance is determined in advance according to the resolution of the scan image data SID. For example, in the present embodiment, the scan image data SID has a resolution of 300 dpi, and the predetermined distance corresponding to the resolution of 300 dpi is ten pixels. In the label data LD of FIG. 3, the distance between a unit area RE1 corresponding to the character "A" and a unit area RE2 corresponding to the character "B" is three pixels. Consequently, the CPU 62 classifies the unit area RE1 and the unit area RE2 into the same unit area group. Thus, the CPU 62 can make a group including characters (e.g., "A" and "B") present in the vicinity. More specifically, the CPU 62 determines, for the scan image SI, a unit area group that includes the seventeen unit areas corresponding to the seventeen characters "A" to "Q" in the text object TOB, and a unit area group that includes the one unit area corresponding to the one photograph object POB (i.e., determines two unit area groups in total). Then, for each of the two unit area groups, the CPU 62 determines the rectangular area circumscribing the unit area group as the object area. That is, from among the scan image SI, the CPU 62 determines the object area TOA which includes the seventeen characters "A" to "Q" in the text object TOB, and an object area POA which includes the photograph object POB (i.e., determines the two object areas TOA, POA in total).

In S150, the CPU 62 determines the type of object area for each of the two object areas TOA, POA determined in S140. Specifically, the CPU 62 determines whether each of the object areas TOA, POA is a text object area that includes characters (simply called "text area" below). The CPU 62 first creates, among the scan image data SID, a histogram showing the distribution of the frequency of the pixel values of the plurality of pixels configuring partial image data representing the object area TOA. Then, using the histogram, the CPU 62 calculates the number of pixel values whose frequency is higher than zero (i.e., the number of colors used in the object area TOA). The CPU 62 determines that the object area TOA is a text area in a case where the calculated number is less than a predetermined number (e.g., "10"), and determines that the object area TOA is not a text area in a case where the calculated number is greater than or equal to the predetermined number. The object area TOA includes the black characters "A" to "Q", and the white background. Consequently, in the histogram corresponding to the object area TOA, usually, only the frequency of two pixel values which include a pixel value indicating black and a pixel value indicating white is greater than zero. Therefore, the CPU 62 determines that the object area TOA is a text area. On the other hand, for example, ten or more colors are usually used in the photograph object POB. Consequently, in the histogram corresponding to the object area POA, the number of pixel values having a frequency greater than zero is usually equal to or greater than the predetermined number. Therefore, the CPU 62 determines that the object area POA is not a text area (i.e., determines that the object area POA is a photograph object area).

In S160, the CPU 62 executes a strip-shaped area determination process (see FIG. 4, to be described) on the text area TOA determined in S150. However, the CPU 62 does not execute the strip-shaped area determination process on the photograph object area POA. When S160 ends, the processes of FIG. 3 end.

Figure 4:
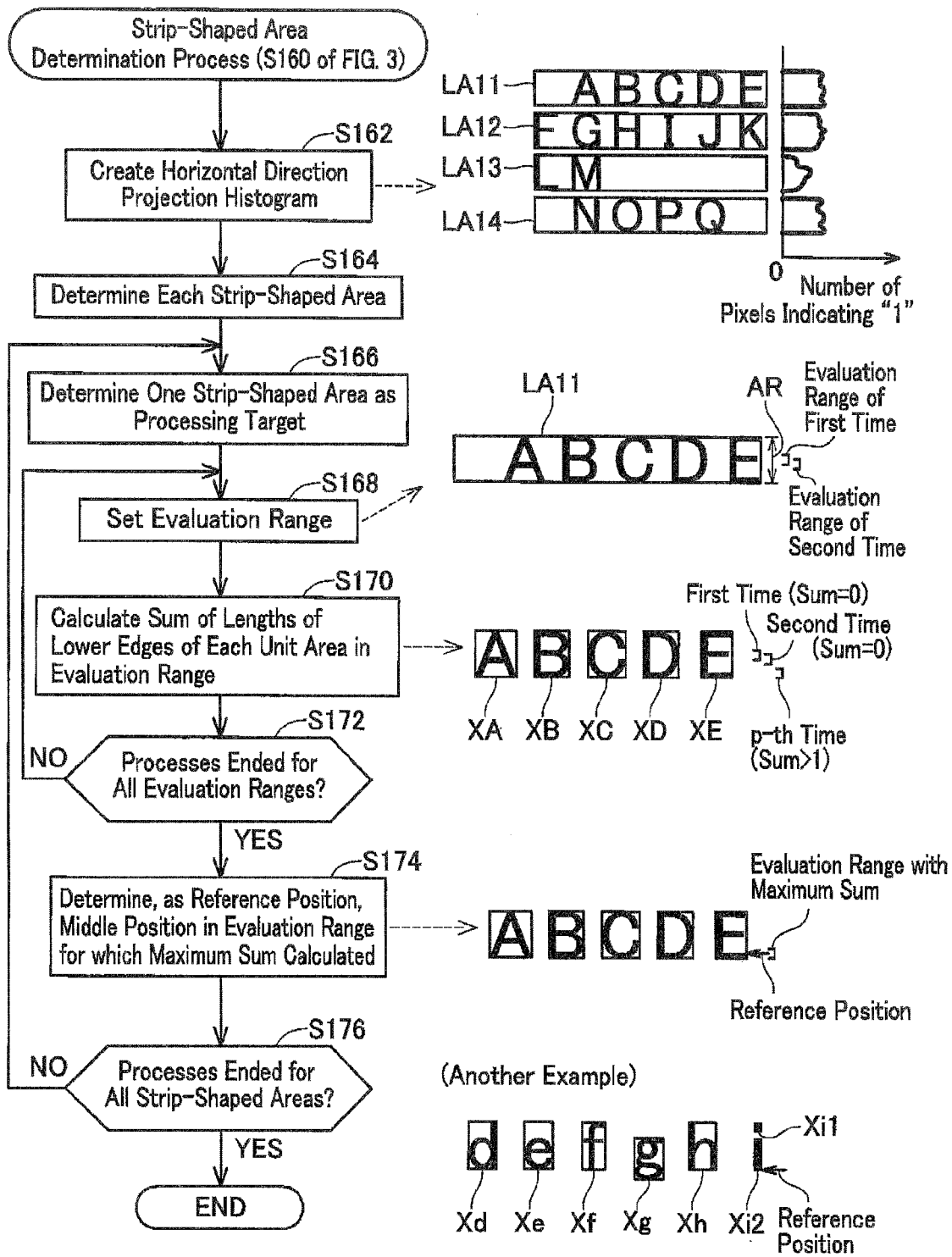
FIG. 4 shows a flowchart of a strip-shaped area determination process.

(Strip-Shaped Area Determination Process; FIG. 4)

Next, the contents of the strip-shaped area determination process executed in S160 of FIG. 3 will be described with reference to FIG. 4. Below, the contents of the process of FIG. 4 will be described using the text area TOA of the scan image SI as an example. In the case where a plurality of text objects are included in the scan image SI, the process of FIG. 4 is executed on each text object (i.e., on each text area).

In S162, the CPU 62 creates a projection histogram corresponding to the text area TOA. The projection histogram shows the distribution of the frequency of ON pixels (i.e., pixels indicating "1") in a case where each pixel representing the text area TOA, among the plurality of pixels configuring the binary data BD (see S110), is projected in a horizontal direction. In other words, the projection histogram shows the distribution of the frequency of character pixels in a case where each pixel representing the text area TOA, among the plurality of pixels configuring the scan image data SID, is projected in the horizontal direction. The character pixels are pixels configuring characters (e.g., "A") included in the text area TOA (i.e., pixels indicating black). In the projection histogram, one line of character string (e.g., "A to E") is represented by a range in which frequency is greater than zero (called "high frequency range" below), and line spacing between two lines of character strings (e.g., line spacing between "A to E" and "F to K") is represented by a range in which frequency is zero.

In S164, using the projection histogram created in S162, the CPU 62 determines one or more strip-shaped areas corresponding to one or more high frequency ranges. The vertical length of one strip-shaped area (i.e., number of pixels in the vertical direction) is equal to the vertical length of one high frequency range corresponding to the one strip-shaped area. Further, the horizontal length of one strip-shaped area (i.e., number of pixels in the horizontal direction) is equal to the horizontal length of the object area TOA. More specifically, the CPU 62 determines, from among the text area TOA, one strip-shaped area LA11 that includes the character string "A to E", one strip-shaped area LA12 that includes the character string "F to K", one strip-shaped area LA13 that includes the character string "LM", and one strip-shaped area LA14 that includes the character string "N to Q" (i.e., determines four strip-shaped areas LA11 to LA14 in total).

Next, the CPU 62 executes the processes of S166 to S174 for determining each reference position corresponding to each strip-shaped area LA11 to LA14. The reference position is a position that serves as a reference for combining the character strings included in each strip-shaped area in the combining process (see FIG. 5, to be described) of S200 of FIG. 2.

In S166, the CPU 62 determines one strip-shaped area (called "target strip-shaped area" below), as the processing target, from among the four strip-shaped areas LA11 to LA14 determined in S164. Below, a case is described as an example in which the strip-shaped area LA11 is determined as the target strip-shaped area.

In S168, the CPU 62 sets an evaluation range of three pixels in the vertical direction from among an entire range AR of the target strip-shaped area LA11 in the vertical direction. In a first time of executing S168 relating to the target strip-shaped area LA11, the CPU 62 sets a current evaluation range of the first time such that the uppermost pixel, of the three pixels, is present at a middle position of the entire range AR in the vertical direction of the target strip-shaped area LA11. In a second and subsequent times of executing S168 relating to the target strip-shaped area LA11, the CPU 62 sets a current evaluation range so as to be lower by one pixel than the previous evaluation range. Moreover, in a modification, the evaluation range may not be a range of three pixels in the vertical direction, but may be a range of one pixel or two pixels in the vertical direction, or may be a range of four or more pixels in the vertical direction.

In S170, the CPU 62 calculates a total lower edge length for the current evaluation range. In a case where lower edges XA to XE of one or more unit areas, among the five unit areas (determined in S130 of FIG. 3) corresponding to the five characters "A" to "E" in the target strip-shaped area LA11, are present in the current evaluation range, the total lower edge length is the sum of the lengths of the lower edges of the one or more unit areas. In the example of FIG. 4, a lower edge of one unit area is not present in the evaluation range of the first time and second time, and consequently the CPU 62 determines "0" as the total lower edge length. Then, in the evaluation range of a p-th time, all of five lower edges XA to XE are present, and consequently the CPU 62 calculates a value equal to or greater than "1" (i.e., the sum of the lengths of the five lower edges XA to XE) as the total lower edge length.

In S172, the CPU 62 determines whether the processes of S168 and S170 have ended for all the evaluation ranges of the target strip-shaped area LA11. Specifically, the CPU 62 determines that the processes have ended for all the evaluation ranges (YES in S172) in a case where a lower end of the entire range AR in the vertical direction of the target strip-shaped area LA11 matches a lower end of the previous evaluation range (e.g., the evaluation range of the p-th time), and proceeds to S174. On the other hand, in a case of determining that the processes have not ended for all the evaluation ranges (NO in S172), the CPU 62 returns to S168, and newly sets an evaluation range.

In S174, the CPU 62 determines the reference position of the target strip-shaped area LA11 based on the plurality of total lower edge lengths calculated for the plurality of evaluation ranges. Specifically, the CPU 62 first selects, from among the plurality of evaluation ranges, one evaluation range (e.g., the evaluation range of the p-th time) for which the maximum total lower edge length was calculated. Moreover, in the case where two or more evaluation ranges for which the maximum total lower edge length was calculated are present among the plurality of evaluation ranges, the CPU 62 selects the evaluation range which was set first from among the two or more evaluation ranges. Then, the CPU 62 determines the middle position in the vertical direction of the selected evaluation range as the reference position. That is, in the example of FIG. 4, a position in the vicinity of the five lower edges XA to XE in the vertical direction of the target strip-shaped area LA11, that is, a position in the vicinity of the lowermost end of the target strip-shaped area LA11 is determined as the reference position.

In S176, the CPU 62 determines whether the processes of S166 to S174 have ended for all of the strip-shaped areas LA11 to LA14. In case of determining that the processes have not ended (NO in S176), in S166 the CPU 62 determines an unprocessed strip-shaped area (e.g., LA12) as the processing target, and again executes the processes from S168 onward. As a result, four reference positions corresponding to the four strip-shaped areas LA11 to LA14 are determined. Then, in case of determining that the processes have ended (YES in S176), the CPU 62 ends the process of FIG. 4.

As described above, in the present embodiment, the length of the lower edge of the unit area of each character is focused upon in order to determine the reference position. Consequently, the total lower edge length is usually not a maximum at the comparatively upper range of the entire range AR in the vertical direction of the target strip-shaped area LA11. Consequently, in S168, the evaluation range of the first time is set at the middle position of the entire range AR in the vertical direction of the target strip-shaped area LA11, and then the evaluation range is moved downward. Thus, it is possible to reduce the number of evaluation ranges set in S168, and consequently it is possible to determine the reference position quickly.

Further, in another example shown in FIG. 4, the target strip-shaped area determined as the processing target in S166 includes six characters "d" to "i", which are lower-case alphabets. One unit area is determined for each character other than the character "i", whereas two unit areas are determined for the character "i". A lower edge Xg of the character "g" is present further below lower edges Xd to Xf, Xh, Xi2 of the other five characters. In this example, one or more total lower edge lengths are calculated for each of an evaluation range including a lower edge Xi1, an evaluation range including the lower edges Xd to Xf, Xh, Xi2, and an evaluation range including the lower edge Xg. Then, since the total lower edge length calculated for the evaluation range including the lower edges Xd to Xf, Xh, Xi2 is the maximum, the middle position of that evaluation range is determined as the reference position. Thus, in the present embodiment, the reference position is determined based on the evaluation range in which the total lower edge length is the maximum, and based on the determined reference position, two or more lines of character strings are combined (see the combined image CI1 of S200 of FIG. 2). Therefore, it is possible to prevent the user finding the alignment unnatural of the plurality of characters configuring the character strings in the processed image PI (see S500 of FIG. 2).

Figure 5:
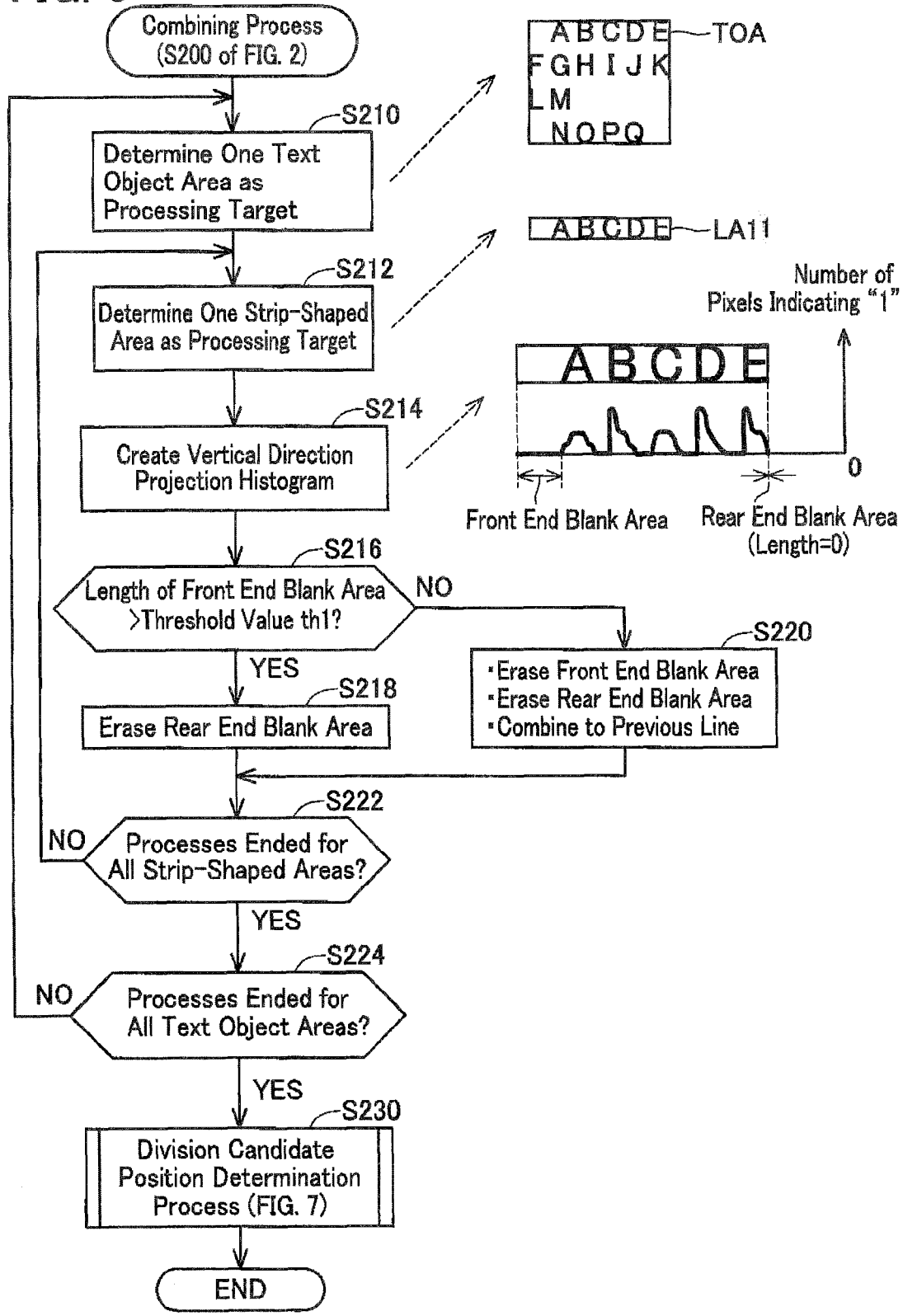
FIG. 5 shows a flowchart of a combining process.

(Combining Process; FIG. 5)

Next, the contents of the combining process executed in S200 of FIG. 2 will be described with reference to FIG. 5. In S210, the CPU 62 determines one text area (called "target text area" below), from among the one or more text areas in the scan image SI, as the processing target. Below, a case is described as an example in which the text area TOA is determined as the target text area.

In S212, the CPU 62 determines one strip-shaped area (called "target strip-shaped area" below), from among the four strip-shaped areas LA11 to LA14 determined for the target text area TOA (see S164 of FIG. 4), as the processing target.

In S214, the CPU 62 creates a projection histogram corresponding to the target strip-shaped area (e.g., LA11). The projection histogram shows the distribution of the frequency of ON pixels (i.e., pixels indicating "1") in a case where each pixel representing the target strip-shaped area, among the plurality of pixels configuring the binary data BD (see S110 of FIG. 3), is projected in the vertical direction. In other words, the projection histogram shows the distribution of the frequency of the character pixels in a case where each pixel representing the target strip-shaped area, among the plurality of pixels configuring the scan image data SID, is projected in the vertical direction. In the projection histogram, one character (e.g., "A") is represented by a range in which frequency is greater than zero, and a blank area between two characters (e.g., "A" and "B") is represented by a range in which frequency is zero. Further, in the projection histogram, in a case where a blank is present between the front end (i.e., left end) of the target strip-shaped area and a leading character (e.g., "A"), a blank area (called "front end blank area" below) is represented by a range in which frequency is zero. Similarly, in a case where a blank is present between the rear end (i.e., right end) of the target strip-shaped area and a final character (e.g., "E"), a blank area (called "rear end blank area" below) is represented by a range in which frequency is zero.

In S216, the CPU 62 uses the projection histogram created in S214 to identify the horizontal length of the front end blank area in the target strip-shaped area, and determines whether the horizontal length of the front end blank area is greater than a threshold value th1. Thus, the CPU 62 can determine whether a comparatively large blank area (i.e., indent) is present in the target strip-shaped area further to the front end side of the character string in the target strip-shaped area. That is, the CPU 62 can determine whether the character string in the target strip-shaped area is a character string configuring the head of a paragraph. The threshold value th1 is determined in accordance with the vertical length of the target strip-shaped area. Specifically, the CPU 62 determines a value equal to the vertical length of the target strip-shaped area as the threshold value th1. However, in a modification, the threshold value th1 may be a value different from the vertical length of the target strip-shaped area (e.g., 0.5 times the vertical length of the target strip-shaped area), or may be a fixed value determined in advance.

In case of determining that the horizontal length of the front end blank area is greater than the threshold value th1 (YES in S216), that is, in case of determining that the character string in the target strip-shaped area is a character string configuring the head of a paragraph, the CPU 62 executes the process of S218 without determining that character string and the character string of the previous line as a combining target. In S218, the CPU 62 determines a new strip-shaped area in which the front end blank area in the target strip-shaped area is maintained, and the rear end blank area in the target strip-shaped area is erased. Moreover, in a case where a rear end blank area is not included in the target strip-shaped area, in S218 the CPU 62 determines the target strip-shaped area, as is, as the new strip-shaped area. Thus, the CPU 62 acquires partial image data representing the determined new strip-shaped area. Since the character string represented by this partial image data includes the indented blank area further to the front than the front end side of the character string, this usually configures a character string that is the head of a paragraph. Consequently, below, this partial image data, and this character string are called "leading partial image data" and "leading character string", respectively.

On the other hand, in case of determining that the horizontal length of the front end blank area is equal to or below the threshold value th1 (NO in S216), that is, in case of determining that the character string in the target strip-shaped area is not a character string configuring the head of a paragraph, the CPU 62 determines this character string and the character string of the previous line as the combining target, and executes the process of S220. In S220, the CPU 62 first determines a new strip-shaped area in which the front end blank area and rear end blank area in the target strip-shaped area have been erased. Moreover, in a case where the target strip-shaped area does not include a front end blank area and a rear end blank area, in S220, the CPU 62 determines the target strip-shaped area, as is, as the new strip-shaped area. Thus, the CPU 62 acquires partial image data representing the determined new strip-shaped area. Usually, the character string represented by this partial image data is not a character string that configures the head of a paragraph. Consequently, below, this partial image data and this character string are called "non-leading partial image data" and "non-leading character string", respectively.

In S220, further, the CPU 62 linearly combines the previous line of character string and the non-leading character string along the horizontal direction such that the previous line of character string (e.g., the leading character string determined in S218) of the non-leading character string is present at the left side, and the non-leading character string is present at the right side. More specifically, the CPU 62 combines the partial image data representing the previous line of character string (e.g., leading character string image data) and non-leading character string image data representing the non-leading character string such that the reference position (see S174 of FIG. 4) determined for the previous line of character string, and the reference position determined for the non-leading character string are present in the same position in the vertical direction. At this juncture, the CPU 62 replenishes pixels representing the blank area, that is, pixels having the background color of the scan image SI, such that a blank area is formed having a fixed length, determined in advance, in the horizontal direction between the previous line of character string and the non-leading character string. That is, the CPU 62 combines the items of partial image data via the pixels to be replenished. The fixed length is a length allowing a blank area having the fixed length to be determined as a division candidate position, to be described (e.g., the length h/4 or more of S242 of FIG. 7). Further, in a case where the image represented by the image data after combination does not form a rectangular shape, the CPU 62 replenishes the pixels having the background color of the scan image SI, so as to create image data which represents an image having a rectangular shape. When S220 ends, the process proceeds to S222.

In S222, the CPU 62 determines whether the processes of S212 to S220 have ended for all of the strip-shaped areas (e.g., LA11 to LA14) included in the target text area. In case of determining that the processes have not ended (NO in S222), in S212 the CPU 62 determines an unprocessed strip-shaped area (e.g., LA12) as the processing target, and again executes the processes from S214 onward. In case of determining that the processes have ended (YES in S222), the CPU 62 proceeds to S224.

In S224, the CPU 62 determines whether the processes of S210 to S222 have ended for all the text areas in the scan image SI. In case of determining that the processes have not ended (NO in S224), in S210 the CPU 62 determines an unprocessed text area as the processing target. In case of determining that the processes have ended (YES in S224), in S230 the CPU 62 ends the process of FIG. 5 after having executed a division candidate position determination process (see FIG. 7, to be described).

Figure 6:
FIG. 6 shows specific examples of the combining process.

(Specific Examples of Combining Process; FIG. 6)

Next, specific examples of the combining process of FIG. 5 will be described with reference to FIG. 6. In (1-1) of (Example 1), it is determined that a front end blank area FB11 of the strip-shaped area LA11 is greater than the threshold value th1 (YES in S216). Since the strip-shaped area LA11 does not include a rear end blank area, the strip-shaped area LA11 is determined, as is, as the new strip-shaped area, and leading partial image data representing the strip-shaped area LA11 is acquired (S218).

In (1-2), it is determined that a front end blank area FB12 of the strip-shaped area LA12 is equal to or less than the threshold value th1 (NO in S216). Since the strip-shaped area LA12 does not include a front end blank area and a rear end blank area, the strip-shaped area LA12 is determined, as is, as the new strip-shaped area, and non-leading partial image data representing the strip-shaped area LA12 is acquired (S220).

In (1-3), the leading partial image data of (1-1) and the non-leading partial image data of (1-2) are combined via pixels representing a blank area having the fixed length (S220), such that the two reference positions of the two strip-shaped areas LA11, LA12 are present at the same position in the vertical direction. As a result, intermediate image data is created that represents an intermediate image MIL this including one line of character string "A to K" in which the character string "A to E" and the character string "F to K" have been combined linearly along the horizontal direction.

In (1-4), it is determined that a front end blank area FB13 of the strip-shaped area LA13 is equal to or less than the threshold value th1 (NO in S216). Since the strip-shaped area LA13 includes a rear end blank area RB13, a new strip-shaped area in which the rear end blank area RB13 has been erased is determined, and non-leading partial image data representing the new strip-shaped area is acquired (S220).

In (1-5), the intermediate image data representing the intermediate image MI1 of (1-3), and the non-leading partial image data of (1-4) are combined via pixels representing a blank area having the fixed length (S220), such that the three reference positions of the three strip-shaped areas LA11 to LA13 are present at the same position in the vertical direction. As a result, combined image data is created that represents the combined image CI1, this including the one line of character string "A to M", in which the character string "A to K" and the character string "LM" have been combined linearly along the horizontal direction.

In (1-3) and (1-5) above, since a blank area having the same fixed length is inserted when the non-leading partial image data is combined, the length of the blank between the character "E" and the character "F" becomes the same as the length of the blank between the character "K" and the character "L" in the combined image CI1, As a result, it is possible to make the length of the blank between the characters configuring the character string "A to M" in the combined image CI1 approximately equal.

In (1-6), it is determined that a front end blank area FB14 of the strip-shaped area LA14 is greater than the threshold value th1 (YES in S216). Since the strip-shaped area LA14 includes a rear end blank area RB14, a new strip-shaped area in which the rear end blank area RB14 has been erased is determined, and leading partial image data representing that new strip-shaped area is acquired (S218). Since the strip-shaped area LA14 is the final processing target (YES in S222 of FIG. 5), the leading partial image data acquired here is combined image data representing the combined image CI2. That is, in (Example 1), two items of combined image data are created that represent the two combined images CI1, CI2 corresponding to two paragraphs.

Next, (Example 2) will be described. (2-1) to (2-5) are approximately the same as (1-1) to (1-5) above. That is, in (2-1), it is determined that a front end blank area FB21 is greater than the threshold value th1, and leading partial image data representing a strip-shaped area LA21 is acquired (S218). In (2-2), it is determined that a front end blank area FB22 is equal to or less than the threshold value th1, and non-leading partial image data representing a strip-shaped area LA22 is acquired (S220). Then, in (2-3), the leading partial image data of (2-1) and the non-leading partial image data of (2-2) are combined (S220). As a result, intermediate image data is created which represents an intermediate image MI2 including one line of character string "d to v". In (2-4), it is determined that a front end blank area FB23 is greater than the threshold value th1, a new strip-shaped area in which a rear end blank area FR23 of a strip-shaped area LA23 has been erased is determined, and non-leading partial image data representing that new strip-shaped area is acquired (S220). In (2-5), the intermediate image data of (2-3) and the non-leading partial image data of (2-4) are combined (S220) such that the three reference positions of the three strip-shaped areas LA21 to LA23 are present at the same position in the vertical direction. As a result, intermediate image data is created which represents an intermediate image MI3 that includes one line of character string "d to vW to Z" in which a character string "d to v" and a character string "W to Z" have been combined linearly along the horizontal direction.

The intermediate image MI3 of (2-5) does not have a rectangular shape. Consequently, in (2-6), pixels representing a blank area in the intermediate image data representing the intermediate image MI3, that is, pixels having the background color of the scan image SI, are replenished such that a combined image CI3 is formed having a rectangular shape that circumscribes the intermediate image MI3 (S220). Thus, combined image data is created that represents the combined image CI3 having a rectangular shape.

Figure 7:
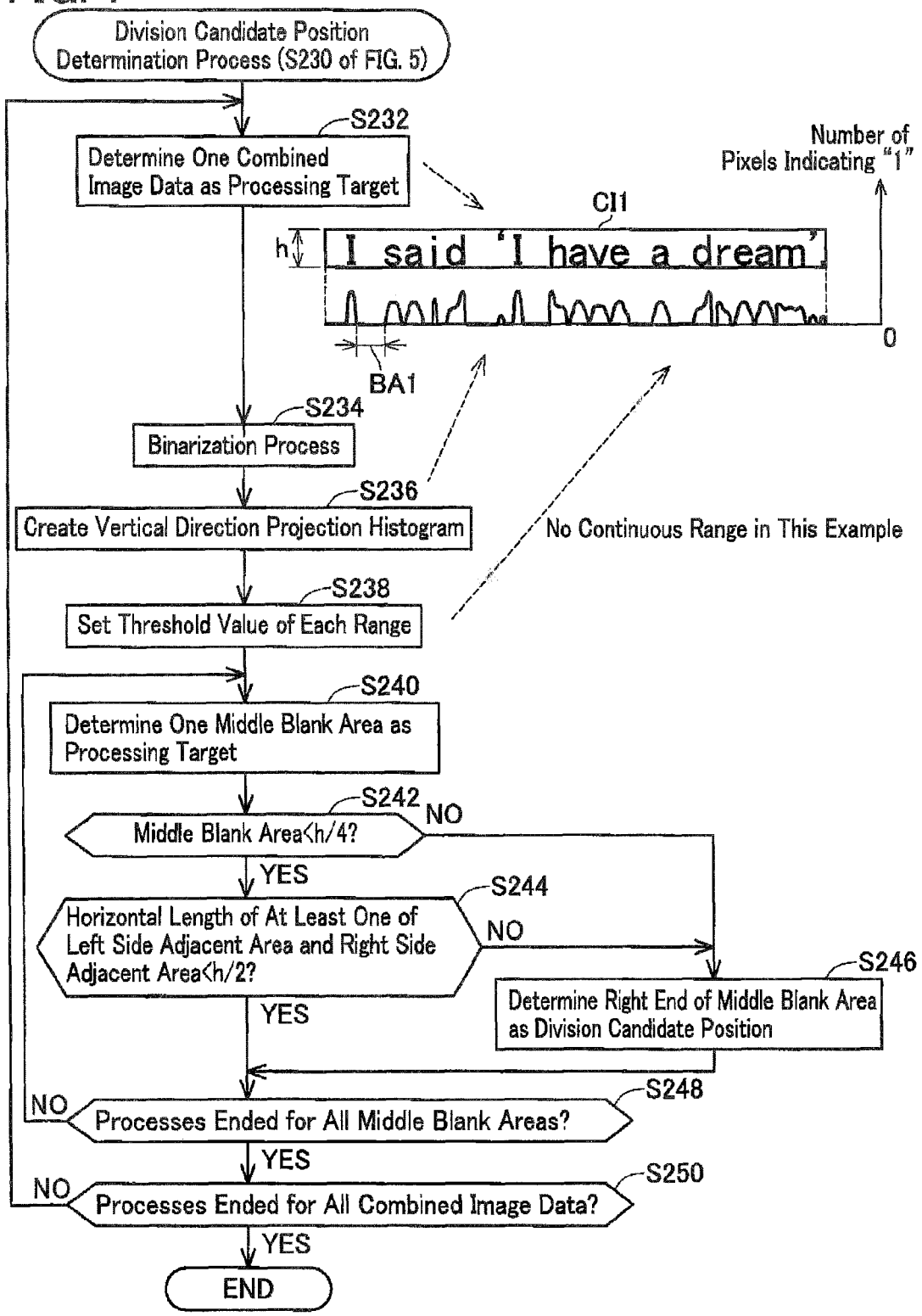
FIG. 7 shows a flowchart of a division candidate position determination process.

(Division Candidate Position Determination Process; FIG. 7)

Next, the contents of the division candidate position determination process executed in S230 of FIG. 5 will be described with reference to FIG. 7. In S232, the CPU 62 determines, as the processing target, one item of combined image data (called "target combined image data" below) from among the one or more items of combined image data representing the one or more combined images (e.g., CI1) created in S210 to S224 of FIG. 5. In the example of FIG. 7, the target combined image CI1 represented by the target combined image data includes an English sentence "I said 'I have a dream'.".

In S234, the CPU 62 executes a binarization process on the target combined image data. The contents of this binarization process are the same as S110 of FIG. 3.

In S236, using binary data created in S234, the CPU 62 creates a projection histogram corresponding to the target combined image data. The projection histogram shows the distribution of the frequency of ON pixels (i.e., character pixels) in a case where each pixel configuring the binary data is projected in the vertical direction. In the projection histogram, one character or symbol (e.g., "I", "'", ".") is represented by a range in which frequency is greater than zero, and a blank portion between two characters or symbols (e.g., a blank portion between "I" and "s", a blank portion between "s" and "a", etc. in "I said") is represented by a range in which frequency is zero.

In S238, the CPU 62 sets a threshold value for distinguishing, within the target combined image CI1, an area in which the character pixels are present and an area in which the character pixels are not present. Specifically, in principal, the CPU 62 sets zero as the threshold value. However, in a case where one or more continuous ranges are present in the projection histogram created in S236, the CPU 62 selects one or more continuous ranges and determines, for each of the selected one or more continuous ranges, a smallest value (i.e., a value greater than zero) of the frequencies within the continuous range as the threshold value. That is, the CPU 62 determines a value greater than zero as the threshold value for the continuous range, and determines zero as the threshold value for a range other than the continuous range. For example, in a case where not even one continuous range is present, as in the target combined image CI1 of FIG. 7, the CPU 62 determines zero as the threshold value for entire range. A continuous range is, for example, a range representing a decoration line, such as a strike-through line, underline, etc. in a case where this decoration line is included in a sentence. Since the decoration line is represented by ON pixels, the range corresponding to the decoration line in the projection histogram has a frequency higher than zero, and is comparatively long in the horizontal direction. Therefore, in the present embodiment, the CPU 62 selects, as the continuous range, a range having a frequency higher than zero and having a horizontal length equal to or greater than a predetermined length. The predetermined length is determined in advance in accordance with the resolution of the scan image data SID. For example, the predetermined length is 50 pixels in a case where the resolution of the scan image data SID is 300 dpi, and the predetermined length is 100 pixels in a case where the resolution is 600 dpi. The predetermined length may be any value as long as it is a length allowing the presence of a decoration line to be identified, and is for example, a value greater than the length of one character in the horizontal direction. The threshold value determined here is used in S240 and S244, to be described.

In S240, the CPU 62 uses the projection histogram created in S236 and the threshold value determined in S238 to determine one middle blank area as the processing target. The middle blank area is an area corresponding to a blank portion between two characters or symbols. Specifically, the middle blank area is an area between two areas having frequencies higher than the threshold value determined in S238, and is an area having a frequency equal to or below the threshold value. For example, in the target combined image CI1 of FIG. 7, the frequency zero is determined as the threshold value for all the ranges. In this case, for example, an area BA1 (i.e., area BA1 in which frequency is zero) between two areas having frequencies greater than zero (i.e., the area "I" and the area "s") is the middle blank area. In S240 of the first time, the CPU 62 determines, as the processing target, the one middle blank area (the area BA1 in the target combined image CI1 of FIG. 7) present at the most front end side (i.e., left side). Then, in S240 of the second and subsequent times, the CPU 62 determines, as the current processing target, one middle blank area present at the most front end side (e.g., the area between "s" and "a" in "said") among the one or more middle blank areas present at the right side of the middle blank area of the previous processing target.

In S242, the CPU 62 determines whether the horizontal length of the middle blank area of the processing target is less than h/4. Here, "h" is the vertical length of the target combined image CI1 (i.e., number of pixels in the vertical direction).

In case of determining that the horizontal length of the middle blank area of the processing target is h/4 or more (NO in S242), in other words, in case of determining that the middle blank area is comparatively large, in S246 the CPU 62 determines the right end of the middle blank area as the division candidate position. Thus, since the blank area is determined as the division candidate position, it is possible to prevent a division being executed in the middle of one character (e.g., "A"). Further, the reason for determining the right end of the middle blank area as the division candidate position is as follows. For example, a situation is assumed in which, one character string is divided at the respective right ends of two middle blank areas included in the one line of character string, and the characters in the one line of character string are re-located to three lines of character strings aligned in the vertical direction. In this case, a blank is not formed at the left side of the character strings of the second line and the third line, and consequently the front end (i.e., left end) of the character strings of the second line and the third line can be aligned. Thus, since the front ends of the character strings of the second line onwards can be aligned, the plurality of lines of character strings that are re-located can be made more attractive in appearance. Moreover, in a modification, in S246 the CPU 62 may determine a position other than the right end of the middle blank area (e.g., left end, middle position, etc.) as the division candidate position. When S246 ends, the process proceeds to S248.

On the other hand, in case of determining that the horizontal length of the middle blank area of the processing target is less than h/4 (YES in S242), in other words, in case of determining that the middle blank area is comparatively small, in S244 the CPU 62 determines whether the horizontal length of at least one of a left side adjacent area and a right side adjacent area is less than h/2. The left side (or right side) adjacent area is an area adjacent to the middle blank area at the left side (or right side) of the middle blank area of the processing target, and is an area having a higher frequency than the threshold value determined in S238. For example, in the middle blank area BA1 in "I said", the area corresponding to "I" and the area corresponding to "a" are the left side adjacent area and the right side adjacent area, respectively.

In S246 the CPU 62 determines the right end of the middle blank area as the division candidate position in case of determining that the horizontal lengths of both the left side adjacent area and the right side adjacent area are equal to or more than h/2 (NO in S244), for example, in the case where comparatively large characters (e.g., upper-case letter of alphabet, Chinese character, Japanese kana, etc.) are present in both the left side adjacent area and the right side adjacent area. On the other hand, the CPU 62 proceeds to S248 without executing S246 in case of determining that the horizontal length of at least one of the left side adjacent area and the right side adjacent area is less than h/2 (YES in S244), for example, in the case where comparatively small characters (e.g., lower-case letter of alphabet) or symbols (e.g., comma, period, quotation symbol, etc.) are present in at least one of the left side adjacent area and the right side adjacent area. That is, the CPU 62 does not determine the middle blank area of the current processing target as the division candidate position.

In S248, the CPU 62 determines whether the processes of S240 to S246 have ended for all the middle blank areas included in the target combined image CI1. In case of determining that the processes have not ended (NO in S248), in S240 the CPU 62 determines the unprocessed middle blank area as the processing target, and again executes the processes from S242 onward. In case of determining that the processes have ended (YES in S248), the CPU 62 proceeds to S250.

In S250, the CPU 62 determines whether the processes of S232 to S248 have ended for all the combined image data created in S210 to S224 of FIG. 5. In case of determining that the processes have not ended (NO in S250), in S232 the CPU 62 determines the unprocessed combined image data as the processing target. In case of determining that the processes have ended (YES in S250), the CPU 62 ends the process of FIG. 7.

(Specific Examples of Division Candidate Position Determination Process; FIG. 8)

Next, specific examples of the division candidate position determination process of FIG. 7 will be described with reference to FIG. 8. A target combined image of case A is the same as the target combined image CI1 of FIG. 7. Consequently, a continuous range (i.e., decoration line) is not present in the target combined image, and the frequency zero is determined as the threshold value for all the ranges (S238). In this case, the area BA1 between "I" and "s" in "I said" is determined as the middle blank area of a processing target of a first time (S240). The middle blank area BA1 corresponds to a blank (so-called space) between the word "I" and the word "said", and usually has a horizontal length of h/4 or more (NO in S242). Consequently, the middle blank area BA1 is determined as the division candidate position (S246). Since the user is unlikely to find it difficult to read the divided character strings when the character string is divided at the blank between the two English words "I" and "said", the middle blank area BA1 is determined as the division candidate position in the present embodiment.

Next, an area BA2 between "s" and "a" in "I said" is determined as a middle blank area of a processing target of a second time (S240). The middle blank area BA2 corresponds to a blank between two characters (i.e., "s" and "a") configuring the one English word "said", and usually has a horizontal length of less than h/4 (YES in S242). Further, the left side adjacent area and the right side adjacent area of the middle blank area BA2 correspond to "s" and "a" in "said", respectively, and usually have a horizontal length of less than h/2 (YES in S244). Consequently, the middle blank area BA2 is not determined as the division candidate position. Since the user is likely to find it difficult to read the divided character strings when the character string is divided at the blank between two characters (e.g., "s" and "a") configuring one English word (e.g., "said"), the middle blank area BA2 is not determined as the division candidate position in the present embodiment.

In the same way as above, it is determined whether the middle blank area is a division candidate position for each of the middle blank areas of a third and subsequent times. For example, since the middle blank area BA3 corresponding to a blank between "d" and "'" in " . . . said 'I . . . " has a horizontal length equal to or greater than h/4 (NO in S242), the middle blank area BA3 is determined as the division candidate position (S246). Further, for example, a middle blank area BA4 corresponding to a blank between "'" and "I" has a horizontal length of less than h/4 (YES in S242). Both the left side adjacent area "'" and the right side adjacent area "I" of the middle blank area BA4 have a horizontal length of less than h/2 (YES in S244). Therefore, the middle blank area BA4 is not determined as the division candidate position. As a result, five division candidate positions are determined for the sentence "I said 'I have a dream'.".

Moreover, in case A, an example is assumed in which a blank between two English words is determined as a division candidate position. However, for example, even when a space of one character is inserted between two Japanese texts, usually NO is determined in S242, and the space is determined as a division candidate position (S246). In a case where a comparatively large blank is present, the blank is usually determined as a division candidate position even for languages different from English and Japanese.

In case B, the target combined image includes the same sentence as case A, but has a strike-through line attached to "'I have a dream'.". In this case, in the projection histogram created in S236, the range corresponding to the strike-through line has a frequency higher than zero, and has a length greater than or equal to the predetermined length (e.g., 50 pixels), and consequently the range is selected as a continuous range. The smallest value of the frequency (i.e., a value greater than zero) in the continuous range is determined as the threshold value for the continuous range (i.e., "'I have a dream'."), and a frequency of zero is determined as the threshold value for a range other than the continuous range (i.e., "I said") (S238).

In the range other than the continuous range (i.e., "I said"), as in case A, the middle blank area is determined using the threshold value zero, and the middle blank area BA1 is determined as the division candidate position (NO in S242). Further, the threshold value is zero in a range at a left side of an area BA5 (i.e., a range in which a strike-through line is not attached), and the threshold value is a positive value in a range at a right side in the area BA5 (i.e., a range in which a strike-through line is attached). Since it is determined that the range at the left side in the area BA5 is equal to or below the threshold value (i.e., zero), and that the range at the right side in the area BA5 is equal to or below the threshold value (i.e., the positive value), the area BA5 is determined as the middle blank area (S240). Further, since it is determined that areas BA6, BA7 in the continuous range are also equal to or below the threshold value (i.e., the positive value), the areas BA6, BA7 are determined as middle blank areas (S240). Then, the middle blank areas BA5, BA7 are determined as division candidate positions (NO in S242, S246), and the middle blank area BA6 is not determined as a division candidate position (YES in S242, YES in S244). Thus, in the present embodiment, since a threshold value greater than zero is determined for the continuous range corresponding to the strike-through line, the adjacent area (e.g., the area corresponding to "I") adjacent to the middle blank area BA5, etc. can be appropriately determined taking the strike-through line into consideration. As a result, as in case A, five division candidate positions can be appropriately determined.

Moreover, in case B, a situation is assumed in which a strike-through line is attached. However, a similar projection histogram can also be obtained in a case where an underline is attached instead of a strike-through line. Therefore, in the case where the underline is attached, as well, five division candidate positions can be appropriately determined, as in case B.

A target combined image of case C includes a Japanese character string. A middle blank area BA8 corresponds to a blank between a parenthesis C1 and a hiragana C2, and usually has a horizontal length of less than h/4 (YES in S242). Further, the right side adjacent area (i.e., the hiragana C2) usually has a horizontal length of h/2 or more, whereas the left side adjacent area (i.e., the parenthesis C1) usually has a horizontal length of less than h/2 (YES in S244). Consequently, the middle blank area BA8 is not determined as the division candidate position. Since the user is likely to find it difficult to read divided character strings when a character string is divided at a blank between a parenthesis and a character, the middle blank area BA8 is not determined as the division candidate position in the present embodiment.

A middle blank area BA9 corresponds to a blank between a left side line and a right side line configuring one hiragana C3, and usually has a horizontal length of less than h/4 (YES in S242). Further, the left side adjacent area (i.e., the left side line configuring the hiragana C3) and the right side adjacent area (i.e., the right side line configuring the hiragana C3) usually have a horizontal length of less than h/2 (YES in S244). Consequently, the middle blank area BA9 is not determined as the division candidate position. Since the user cannot recognize the one hiragana C3 if the one hiragana C3 is divided, the middle blank area BA9 is not determined as the division candidate position in the present embodiment. Moreover, a blank may be formed between one character in not only the hiragana C3, but also in hiragana C8 to C10, a katakana C11, and a Chinese character C12, and these blanks are also usually not determined as the division candidate position (YES in S244).

A middle blank area BA10 corresponds to a blank between a hiragana C4 and a hiragana C5, and usually has a horizontal length of less than h/4 (YES in S242). The left side adjacent area (i.e., the hiragana C4) and the right side adjacent area (i.e., the hiragana C5) usually have a horizontal length of h/2 or more (NO in S244). Consequently, the middle blank area BA10 is determined as the division candidate position (S246). Since the user is unlikely to find it difficult to read divided character strings when a character string is divided at a blank between two Japanese characters, the middle blank area BA10 is determined as the division candidate position in the present embodiment.

A middle blank area BA11 corresponds to a blank between a hiragana C6 and a period C7, and usually has a horizontal length of less than h/4 (YES in S242). The left side adjacent area (i.e., the hiragana C6) usually has a horizontal length of h/2 or more, whereas the right side adjacent area (i.e., the period C7) usually has a horizontal length of less than h/2 (YES in S244). Consequently, the middle blank area BA11 is not determined as the division candidate position. Since it likely for the user to find it difficult to read divided character strings when the character string is divided at the blank between the character and the period, the middle blank area BA11 is not determined as the division candidate position in the present embodiment. Moreover, similarly, a blank between a character and a comma is also usually not determined as the division candidate position (YES in S244).

Figure 9:
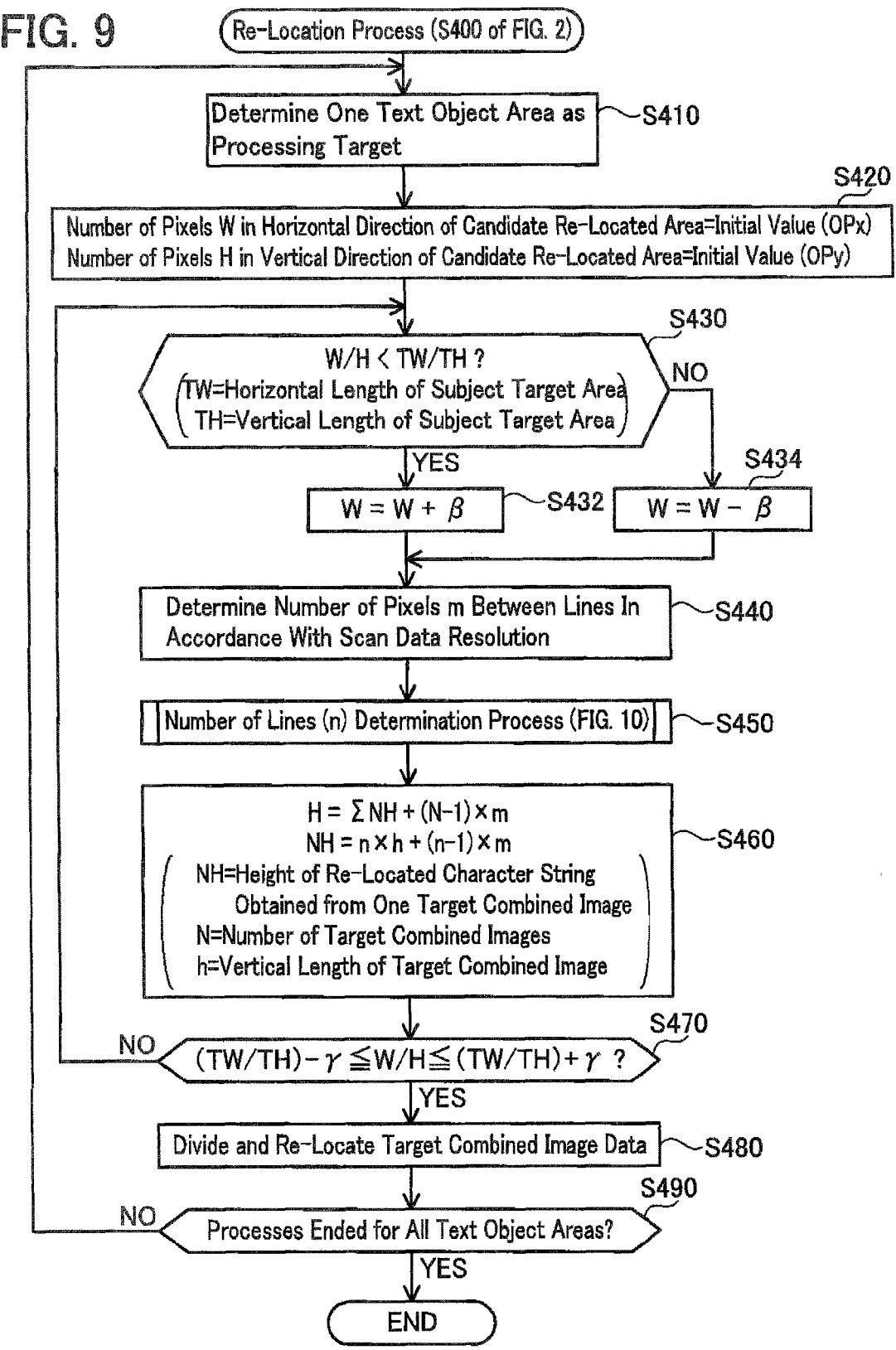
FIG. 9 shows a flowchart of a re-location process.

(Re-Location Process; FIG. 9)

Next, the contents of the re-location process executed in S400 of FIG. 2 will be described with reference to FIG. 9. In S410, the CPU 62 determines, as the processing target, one text area (e.g., TOA) among the one or more text areas in the scan image SI. Below, the text area determined as the processing target in S410 is called "target text area". Further, the target area (e.g., the TA of S300 of FIG. 2) determined for the target text area is called "subject target area". Further, a combined image in which the character strings included in the target text area are combined (e.g., CI1, CI2 of S200 of FIG. 2), and combined image data representing the combined image, are called "target combined image" and "target combined image data", respectively.

In S420, the CPU 62 sets a horizontal length OPx and a vertical length OPy of the target text area, respectively, as an initial value of horizontal length W (i.e., number of pixels W in the horizontal direction) and an initial value of vertical length H (i.e., number of pixels H in the vertical direction) of a candidate re-located area which is a candidate of a re-located area (see RA of S400 of FIG. 2) to be determined.

In S430, the CPU 62 determines whether a ratio W/H of the horizontal length W to the vertical length H of the candidate re-located area is less than a ratio TW/TH of horizontal length TW to vertical length TH of the subject target area.

In case of determining that the ratio W/H is less than the ratio TW/TH (YES in S430), in S432 the CPU 62 adds a fixed value β determined in advance (e.g., one pixel) to the current horizontal length W of the candidate re-located area, and determines a new horizontal length W of the candidate re-located area. When S432 ends, the process proceeds to S440.

On the other hand, in case of determining that the ratio W/H is equal to or more than the ratio TW/TH (NO in S430), in S434 the CPU 62 subtracts the fixed value β (e.g., one pixel) determined in advance from the current horizontal length W of the candidate re-located area, and determines a new horizontal length W of the candidate re-located area. When S434 ends, the process proceeds to S440. Moreover, in the present embodiment, the same fixed value β is used in S432 and S434. However, in a modification, the fixed value of S432 and the fixed value of S434 may be different values.

In S440, the CPU 62 determines a length m of a line spacing along the vertical direction (i.e., number of pixels m of the line spacing) in accordance with the resolution of the scan image data SID. For example, in a case where the resolution of the scan image data SID is 300 dpi, the CPU 62 determines one pixel as the length m of the line spacing, and in a case where the resolution of the scan image data SID is 600 dpi, the CPU 62 determines two pixels as the length m of the line spacing. That is, the higher the resolution of the scan image data SID, the greater the length m of the line spacing determined by the CPU 62. According to this configuration, the CPU 62 can determine the length m of the line spacing having an appropriate size in accordance with the resolution of the scan image data SID. Moreover, in a modification, the same value may be adopted as the length m of the line spacing regardless of the resolution of the scan image data SID.

In S450, the CPU 62 executes a number of lines determination process (see FIG. 10, to be described) based on the target combined image data and the new horizontal length W of the candidate re-located area determined in S432 or S434. In the number of lines determination process, the CPU 62 determines a number of lines in a case where a plurality of characters (e.g., "A to M") included in the target combined image (e.g., CI1 of FIG. 2) are re-located in the candidate re-located area.

Figure 10:
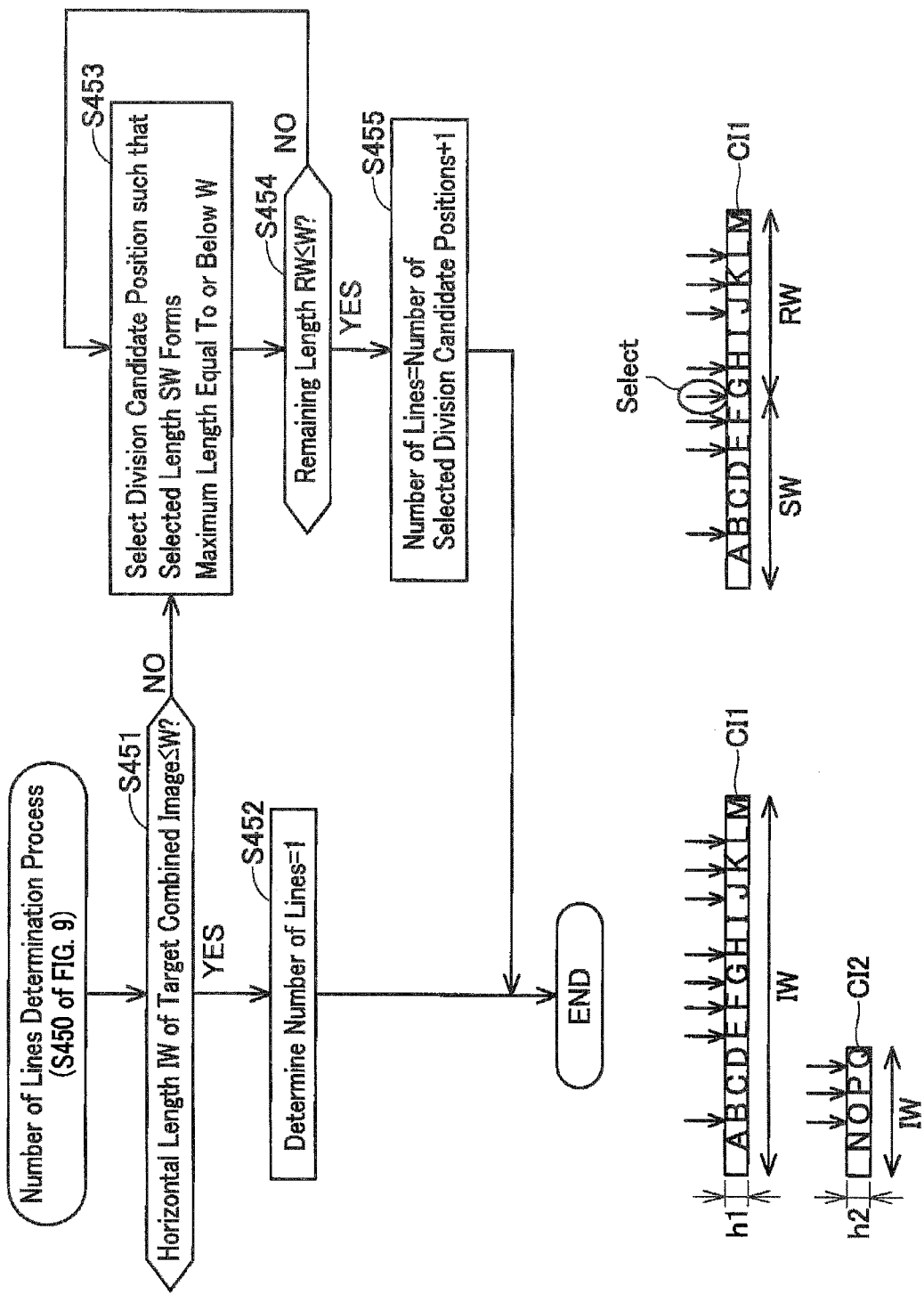
FIG. 10 shows a flowchart of a number of lines determination process.

(Number of Lines Determination Process; FIG. 10)

The contents of the number of lines determination process executed in S450 of FIG. 9 will be described with reference to FIG. 10. In the case where two or more target combined images are present, the CPU 62 determines two or more numbers of lines corresponding to the two or more target combined images by executing the number of lines determination process for each one target combined image.

In S451, the CPU 62 determines whether a horizontal length IW of one target combined image (e.g., CI1) is equal to or less than the horizontal length W of the candidate re-located area. In case of determining that the length IW is equal to or less than the length W (YES in S451), in S452 the CPU 62 determines "1" as the number of lines. This is because, in a state where all the characters (e.g., "A to M") included in the target combined image (e.g., CI1) are located linearly along the horizontal direction, all the characters fit in the candidate re-located area. When S452 ends, the process of FIG. 10 ends.

On the other hand, in case of determining that the length IW is greater than the length W (NO in S451), the CPU 62 needs to divide and locate, into a plurality of lines, a plurality of characters included in the target combined image. Therefore, the CPU 62 executes S453 and 454, so as to select one or more division candidate positions from among the plurality of division candidate positions determined in FIG. 7 (e.g., see arrows attached to the target combined image CI1 in FIG. 10).

In S453, the CPU 62 selects one division candidate position from among the plurality of division candidate positions such that a selected length SW will be a maximum length equal to or less than the horizontal length W of the candidate re-located area. In a state where not even one division candidate position has yet been selected, the selected length SW is the horizontal length between the front end (i.e., left end) of the target combined image, and the division candidate position to be selected. Further, in a state where one or more division candidate positions have already been selected, the selected length SW is the horizontal length between the most recently selected division candidate position, and a division candidate position to be newly selected that is present further to the rear than the rear end side (i.e., right side) of the most recently selected division candidate position. In the example of FIG. 10, a division candidate position is selected between the character "F" and the character "G" included in the target combined image CI1.

In S454, the CPU 62 determines whether a remaining length RW is equal to or less than the horizontal length W of the candidate re-located area. The remaining length RW is the horizontal length between the most recently selected division candidate position and the rear end (i.e., right end) of the target combined image. In case of determining that the remaining length RW is greater than the length W (NO in S454), the CPU 62 returns to S453, and newly determines, from among the plurality of division candidate positions, a division candidate position present to the rear end side of the most recently selected division candidate position.

On the other hand, in case of determining that the remaining length RW is equal to or less than the length W (YES in S454), in S455 the CPU 62 determines, as the number of lines, a number obtained by adding "1" to the number of selected division candidate positions. When S455 ends, the process of FIG. 10 ends.

In the example of FIG. 10, the CPU 62 selects only one division candidate position for the target combined image CI1. As a result, the CPU 62 determines "2" as the number of lines corresponding to the target combined image CI1. Further, the CPU 62 determines that the horizontal length IW of the target combined image CI2 is equal to or less than the horizontal length W of the candidate re-located area (YES in S451) and, as a result, determines "1" as the number of lines corresponding to the target combined image CI2.

(Continuation of Re-Location Process; FIG. 9)

In S460 of FIG. 9, the CPU 62 determines a new length H in the vertical direction of the candidate re-located area according to the formula in S460. In the formula in S460, "NH" is the height of a re-located character string obtained from one target combined image, and "N" is the number of target combined images. Further, "m" is the length of line spacing determined in S440, "n" is the number of lines determined in S450, and "h" is the vertical length of the target combined image (see "h1" of the combined image CI1, and "h2" of the combined image CI2 of FIG. 10).

In S470, the CPU 62 determines whether the aspect ratio W/H of the candidate re-located area is approximate to the aspect ratio TW/TH of the subject target area. Specifically, the CPU 62 determines whether the aspect ratio W/H of the candidate re-located area is included in a predetermined range set on the basis of the aspect ratio TW/TH of the subject target area. The predetermined range is a range between a value obtained by subtracting a value γ from the aspect ratio TW/TH of the subject target area, and a value obtained by adding the value γ to the aspect ratio TW/TH of the subject target area. Moreover, the value γ may be a fixed value determined in advance, or may be a value obtained by multiplying a predetermined coefficient (e.g., 0.05) with TW/TH.

In case of determining that the aspect ratio W/H of the candidate re-located area does not approximate the aspect ratio TW/TH of the subject target area (NO in S470), the CPU 62 again executes the processes of S430 to S460. Thus, the CPU 62 determines a new horizontal length W of the candidate re-located area and a new length H in the vertical direction, and again executes the determination of S470.

On the other hand, in case of determining that the aspect ratio W/H of the candidate re-located area is approximate to the aspect ratio TW/TH of the subject target area (YES in S470), in S480 the CPU 62 first determines a candidate re-located area having the horizontal length W and the length H in the vertical direction as the re-located area (e.g., RA of FIG. 2). Then, in a case where one or more division candidate positions have been selected in S453 of FIG. 10, the CPU 62 divides the target combined image data at the selected one or more division candidate positions, so as to create two or more items of divided image data representing two or more divided images. Next, the CPU 62 locates the two or more items of divided image data in the re-located area such that the two or more divided images are aligned along the vertical direction. At this juncture, the CPU 62 relocates the two items of divided image data such that the line spacing determined in S440 is formed between two divided images that are adjacent along the vertical direction. As a result, as shown for example in S400 of FIG. 2, the re-located image data representing the re-located image RI is created in which the plurality of characters "A" to "Q" are re-located in the re-located area RA. The size of the plurality of characters "A" to "Q" in the re-located image RI is equal to the size of the plurality of characters "A" to "Q" in the scan image SI.

In S490, the CPU 62 determines whether the processes of S410 to S480 have ended for all the text areas. In case of determining that the processes have not ended (NO in S490), in S410 the CPU 62 determines the unprocessed text area as the processing target, and again executes the processes from 5412 onward. In case of determining that the processes have ended (YES in S490), the CPU 62 ends the process of FIG. 9.

Figure 11:
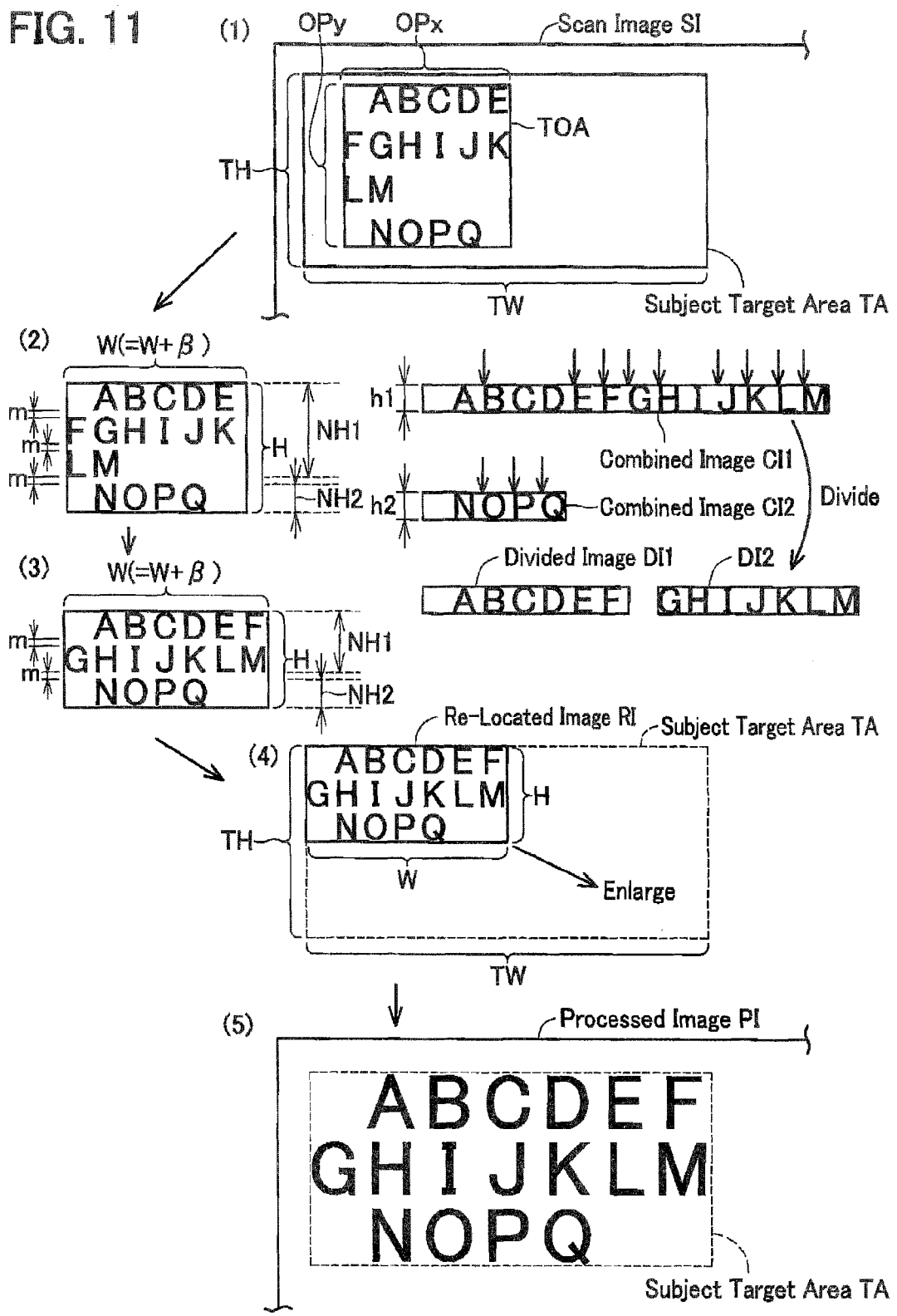
FIG. 11 shows specific examples of the re-location process and an enlarging process.

(Specific Case; FIG. 11)

Next, a specific case of the re-location process of S400 (see FIG. 9) and the enlarging process of S500 of FIG. 2 will be described with reference to FIG. 11. As shown in (1), the horizontal length OPx and the vertical length OPy of the target text area TOA are set, respectively, as the initial value of the horizontal length W of the candidate re-located area and the initial value of the vertical length H (S420 of FIG. 9). In the present case, W/H is less than TW/TH. That is, the subject target area TA has a landscape shape compared to the target text area TOA. In this case, if the candidate re-located area is given a landscape shape, the aspect ratio of the candidate re-located area becomes closer to the aspect ratio of the subject target area TA. Consequently, as shown in (2), the fixed value β is added to the current horizontal length W of the candidate re-located area, so as to determine a new horizontal length W of the candidate re-located area (S432).

Next, three lines including the character string "A to E", the character string "F to K", and the character string "LM" are determined as the number of lines corresponding to the combined image CI1, and one line including the character string "N to Q" is determined as the number of lines corresponding to the combined image CI2 (S450). Next, the vertical length NH1 (=three lines×h1+(three lines−1)×m) is calculated of the three lines of re-located character strings (i.e., "A to E", "F to K", "LM") obtained from the combined image CI1, and the vertical length NH2 (=one line×h2+(one line−1)×m) is calculated of the one line of re-located character string (i.e., "N to Q") obtained from the combined image CI2 (S460). Then, a new length H in the vertical direction of the candidate re-located area (=NH1+NH2+(2−1)×m) is determined (S460).

In the state of (2), since the aspect ratio W/H of the candidate re-located area does not approximate the aspect ratio TW/TH of the subject target area TA (NO in S470), as shown in (3), the fixed value β is again added to the current horizontal length W of the candidate re-located area, so as to again determine a new horizontal length W of the candidate re-located area (S432).

Next, two lines including the character string "A to F" and the character string "G to M" are determined as the number of lines corresponding to the combined image CI1 (S450). That is, due to the horizontal length W of the candidate re-located area having increased, the maximum number of characters which can configure one line of character string in the candidate re-located area increases. Further, one line including the character string "N to Q" is determined as the number of lines corresponding to the combined image CI2 (S450). Next, the vertical length NH1 (=two lines×h1+(two lines−1)×m) is calculated of the two lines of re-located character strings (i.e., "A to F", "G to M") obtained from the combined image CI1, and the vertical length NH2 (=one line×h2+(one line−1)×m) is calculated of the one line of re-located character string (i.e., "N to Q") obtained from the combined image CI2 (S460). Then, a new length H in the vertical direction of the candidate re-located area (=NH1+NH2+(2−1)×m) is determined (S460).

In the state of (3), the aspect ratio W/H of the candidate re-located area is approximate to the aspect ratio TW/TH of the subject target area TA (YES in S470). Consequently, as shown in (4), the candidate re-located area of (3) is determined as the re-located area RA (S480). Next, the combined image data representing the combined image CI1 is divided, so as to create two items of divided image data representing two divided images DI1, DI2 (S480). Then, the two items of divided image data representing the two divided images DI1, DI2 and the target combined image data representing the combined image CI2 are located in the re-located area RA such that the two divided images DI1, DI2 and the combined image CI2 are aligned along the vertical direction, and the line spacing having the length m is formed between two adjacent images. As a result, the re-located image data representing the re-located image RI is created (S480).

Next, the re-located image data is enlarged, so as to create enlarged image data representing an enlarged image (S500 of FIG. 2). Specifically, the re-located image RI is enlarged in a direction in which a diagonal line of the re-located image RI extends, and consequently the enlarged image data representing the enlarged image is created. For example, in a case where the aspect ratio W/H of the re-located area RA is equal to the aspect ratio TW/TH of the subject target area TA, all four edges of the enlarged image match the four edges of the subject target area TA. That is, in this case, the size of the enlarged image matches the size of the target area TA. However, for example, in a case where the aspect ratio W/H of the re-located area RA is not equal to the aspect ratio TW/TH of the subject target area TA, during the process of gradually enlarging the re-located image RI, the enlargement of the re-located image RI ends at the stage when any edge of the enlarged image has matched any edge of the subject target area TA. That is, in this case, the size of the enlarged image is smaller than the size of the target area TA.

Next, as shown in (5), the enlarged image data, in which the re-located image data representing the re-located image RI has been enlarged, is overwritten into the target area TA of the scan image data SID (S500 of FIG. 2). As a result, the processed image data PID representing the processed image PI is completed.

(Effect of First Embodiment)

According to the present embodiment, the image processing server 50 combines the three items of partial image data representing three lines of character strings (i.e., "A to E", "F to K", "LM") obtained from the scan image data SID, and creates the combined image data representing the combined image CI1 including one character string in which the three lines of character strings have been combined linearly along the horizontal direction (S200 of FIG. 2). At this juncture, the image processing server 50 creates the combined image data by using the unit areas corresponding to the characters in the scan image SI (S130 of FIG. 3, S170 of FIG. 4). However, when the combined image data is to be created temporarily, and then the plurality of characters in the scan image SI are to be re-located in the re-located area RA, the combined image data needs only to be divided (S480 of FIG. 9, FIG. 11), and data indicating the positions of the characters in the scan image SI does not need to be used. In particular, when the combined image data is divided, the image processing server 50 does not execute the division into single characters, but executes the division into divided image data representing a divided image (e.g., CI1 of FIG. 11) that includes two or more characters. That is, the image processing server 50 does not need to execute the process with one character in the scan image SI as a unit. As a result, the image processing server 50 may execute the process quickly, and consequently the processed image data PID may be provided quickly to the user of the multi-function device 10.

Further, in the present embodiment, after creating the combined image data representing the combined image CI1, the image processing server 50 can appropriately determine a plurality of divided candidate positions of the combined image data by using the projection histogram created in S236 of FIG. 7. That is, the image processing server 50 can appropriately determine the division positions of the combined image data in response to the various cases shown in FIG. 8. Therefore, the image processing server 50 can divide the combined image data at an appropriate position, and can appropriately create the re-located image data representing the re-located image RI. As a result, by using the re-located image data, the image processing server 50 can provide the appropriate processed image PI to the user.

(Correspondence Relationship)

The image processing server 50 is an example of "image processing device". The scan image SI and the text area TOA are an example of "original image" and "text area", respectively. In the example of FIG. 11, the four lines of character strings "A to Q", and the leading three lines of character strings "A to M" among the four lines of character strings "A to Q" in the scan image SI, are an example of "K lines of character strings" and "M lines of character strings", respectively. The character string "A to M" in the combined image CI1, and the leading two lines of character strings "A to M" in the processed image PI are an example of "target character string" and "N lines of divided character strings", respectively. The three items of partial image data representing the three lines of character strings "A to M" in the scan image SI, the combined image data representing the combined image CI1, the two items of divided image data representing the two divided images DI1, DI2, and the processed image data PID are an example of "M items of original character string image data", "target character string image data", "N items of divided character string image data" and "output image data", respectively. Further, the horizontal direction, the left side, and the right side are an example of "first direction", "first side in the first direction" and "second side in the first direction", respectively. The vertical direction, the upper side, and the lower side are an example of "second direction", "first side in the second direction" and "second side in the second direction", respectively.

The projection histogram created in S162 and the four strip-shaped areas LA11 to LA14 determined in S164 in FIG. 4 are an example of "first projection histogram" and "K items of character string areas", respectively. In FIG. 5, the four projection histograms created in S214 for the four strip-shaped areas LA11 to LA14 are an example of "K items of second projection histograms". The horizontal length of the front end blank area and the threshold value th1 of FIG. 5 are an example of "first length" and "first threshold value", respectively.

Figure 12:
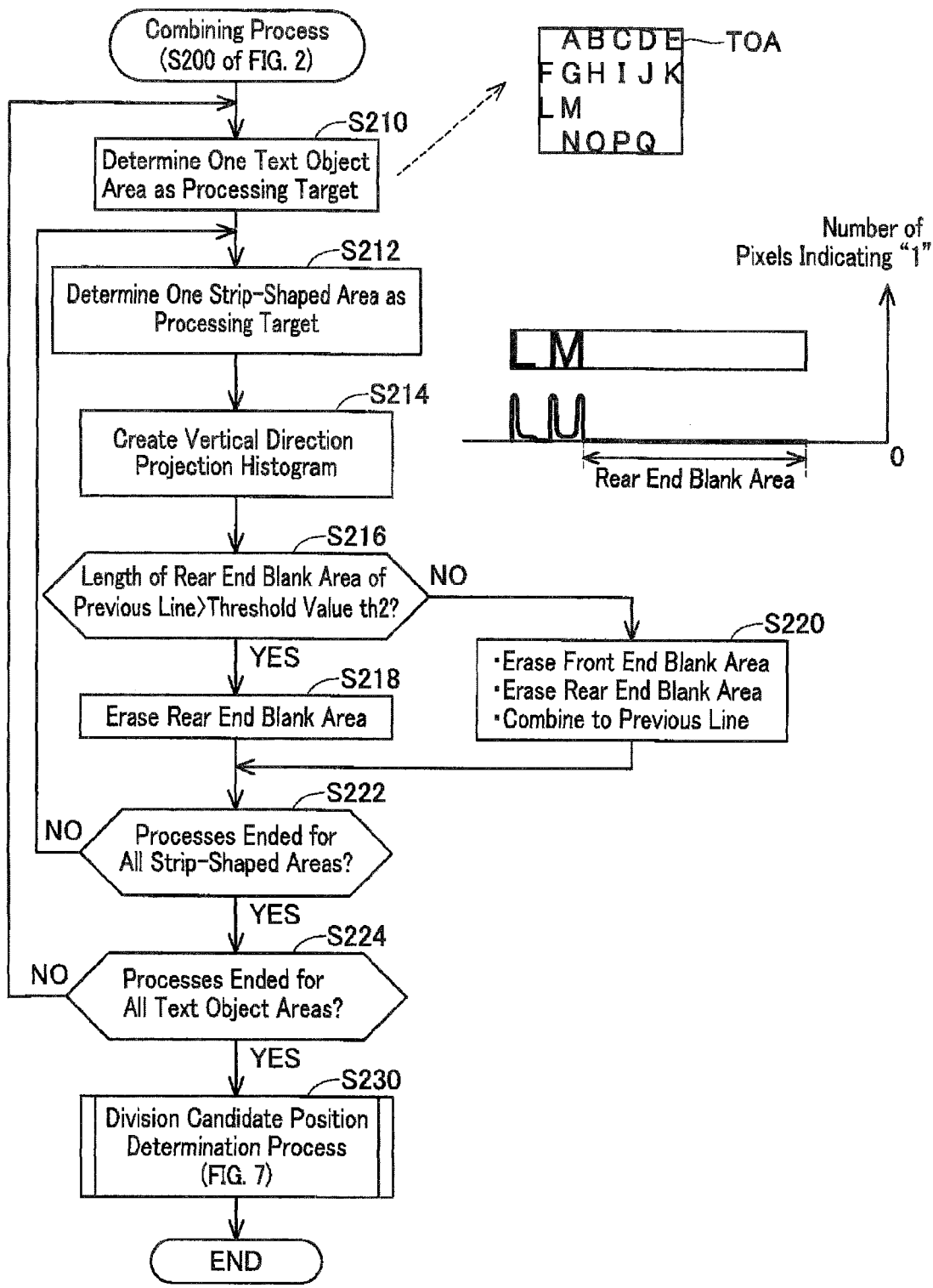
FIG. 12 shows a flowchart of a combining process of a second embodiment.

(Second Embodiment; FIG. 12)

In S216 of FIG. 5 of the first embodiment, in order to create one item of combined image data for each paragraph, the CPU 62 of the image processing server 50 determines whether the character string in the target strip-shaped area is a character string configuring the head of a paragraph. In order to determine whether the character string is a character string configuring the head of a paragraph, the CPU 62 determines whether the horizontal length of the front end blank area in the target strip-shaped area is greater than the threshold value th1. Instead, in the present embodiment, the CPU 62 executes the process below.

That is, in S216 of FIG. 12 of the present embodiment, in order to determine whether the character string in the current target strip-shaped area is a character string configuring the head of a paragraph, the CPU 62 determines whether a previous line of character string (i.e., a character string in the previous target strip-shaped area) previous to the current character string in the target strip-shaped area is a character string configuring a final paragraph. Specifically, the CPU 62 identifies the horizontal length of the rear end blank area in the previous target strip-shaped area, and determines whether the identified horizontal length of the rear end blank area is greater than a threshold value th2. For example, in the projection histogram in FIG. 12, the character string "LM" in the previous target strip-shaped area configures a final character string of the paragraph, and the previous target strip-shaped area has a rear end blank area greater than the threshold value th2. In this case, the CPU 62 can determine that the character string in the current target strip-shaped area is a character string configuring the head of a paragraph (YES in S216). The threshold value th2 is determined in accordance with the vertical length of the previous target strip-shaped area. Specifically, the CPU 62 determines a value two times the vertical length of the previous target strip-shaped area as the threshold value th2. However, in a modification, the threshold value th2 may be a value other than two times the vertical length of the previous target strip-shaped area (e.g., 1.5 times), or may be a fixed value determined in advance. The processes S218 or S220 that are executed in response to the determination result of S216 are the same as the first embodiment.

In the present embodiment, also, the image processing server 50 can appropriately determine whether the character string in the current target strip-shaped area is a character string configuring the head of a paragraph and, as a result, can create one item of combined image data for each paragraph. In the present embodiment, the horizontal length of the rear end blank area in the previous target strip-shaped area and the threshold value th2 are an example of "second length" and "second threshold value", respectively.

(Third Embodiment)

In the present embodiment, the process of S216 of FIG. 5 is different from the first embodiment and second embodiment. In the present embodiment, the CPU 62 combines the determination of S216 of the first embodiment and the determination of S216 of the second embodiment, to determine whether the character string in the current target strip-shaped area is a character string configuring the head of a paragraph. Specifically, the CPU 62 determines whether the horizontal length of the front end blank area in the current target strip-shaped area is greater than the threshold value th1, and whether the horizontal length of the rear end blank area in the previous target strip-shaped area is greater than the threshold value th2. The threshold value th1 and the threshold value th2 used here are the same as the threshold value th1 of the first embodiment and the threshold value th2 of the second embodiment, respectively. The processes S218 or S220 that are executed in response to the determination result of S216 are the same as the first embodiment.

In the present embodiment also, the image processing server 50 can appropriately determine whether the character string in the current target strip-shaped area is a character string configuring the head of a paragraph.

(Variation 1)

In the embodiments described above, the characters "A to Q" in the scan image SI are represented as an enlargement in the processed image PI (see FIG. 11). Instead, characters having the same size as the characters "A to Q" in the scan image SI may be represented in the processed image PI (i.e., see the re-located image RI of FIG. 11 (4)), or characters having a smaller size than the characters "A to Q" in the scan image SI may be represented in the processed image PI. That is, it is enough to create output image data representing the N lines of divided character strings.

(Variation 2)

In S166 to S174 of FIG. 4, the middle position, in the evaluation range for which the maximum total lower edge length was calculated, is determined as the reference position. Instead, the CPU 62 may determine, as the reference position, an uppermost end position or lowermost end position in the evaluation range for which the maximum total lower edge length was calculated. In the present variation, the uppermost end position or lowermost end position in the evaluation range is an example of "specific position". Further, in another modification, the CPU 62 may determine, as the reference position, for example, a predetermined position (e.g., middle position, upper end position, lower end position, etc.) in the vertical direction of the target strip-shaped area. That is, "reference position" may be any reference position for combining M items of original character string image data. Moreover, "reference position" is preferably determined based on characteristics of the language (i.e., characters) included in the scan image SI.

(Variation 3)

In FIG. 11, since the subject target area TA has a landscape shape, the leading three lines of character strings "A to M" in the scan image SI are re-located to the two lines of character strings "A to M" in the processed image PI. However, the leading three lines of character strings "A to M" in the scan image SI may be re-located to three lines of character strings "A to M" in the processed image PI. Further, for example, in the case where the subject target area TA has a portrait shape, the leading three lines of character strings "A to M" in the scan image SI may be re-located to four lines or more of character strings "A to M" in the processed image PI. In this case, the number of characters of the leading line of character string in the processed image PI may be smaller than the number of characters of the leading character string in the scan image SI. Generally speaking, a number of characters of a leading line of divided character string among the N lines of divided character strings may be different from a number of characters of a leading line among the M lines of original character strings. Further, N=M is possible, N>M is possible, and N<M is possible.

(Variation 4)

In the embodiments described above, the image processing server 50 executes image processing (i.e., the processes S100 to S500 of FIG. 2) on the scan image data SID so as to create the processed image data PID, and sends the processed image data PID to the multi-function device 10 (S600). Instead, the multi-function device 10 may execute image processing on the scan image data SID so as to create the processed image data PID (i.e., the image processing server 50 need not be present). In the present variation, the multi-function device 10 is an example of "image processing device".

(Variation 5)

The target of the image processing executed by the image processing server 50 may not be the scan image data SID, but may be data created by document creation software, spreadsheet software, image creation software, etc. That is, "original image data" is not restricted to data obtained by scanning a scan target sheet, but may be any type of data.

(Variation 6)

The processed image data PID may not be data used for printing by the multi-function device 10, but may be for example, data used for displaying in a display. Generally speaking, "output image data" may be any data representing an image for output (printing, display, etc.).

(Variation 7)

In the embodiments described above, the scan image SI includes a character string in which a sentence proceeds from the left side toward the right side in the horizontal direction, and the sentence proceeds from the upper side toward the lower side in the vertical direction (i.e., a horizontally written character string). Instead, the scan image SI may include a character string in which a sentence proceeds from the upper side toward the lower side in the vertical direction, and the sentence proceeds from the right side toward the left side in the horizontal direction (i.e., a vertically written character string). In this case, in S162 and S164 of FIG. 4, the image processing server 50 usually cannot determine the strip-shaped area based on a projection histogram in the horizontal direction. Consequently, the image processing server 50 creates a projection histogram in the vertical direction, and determines the strip-shaped area. Then, the image processing server 50 may execute the same processes as in the embodiments described above by using the vertical direction instead of the horizontal direction, and using the horizontal direction instead of the vertical direction. In the present variation, the vertical direction and the horizontal direction are an example of "first direction" and "second direction", respectively. The upper side and the lower side in the vertical direction are an example of "first side in the first direction" and "second side in the first direction", respectively. The right side and the left side in the horizontal direction are an example of "first side in the second direction" and "second side in the second direction", respectively.

(Variation 8)

In the embodiments described above, the CPU 62 of the image processing server 50 realizes the processes of FIG. 2 to FIG. 12 by executing the program 66 (i.e., software). Instead, at least one of the processes of FIG. 2 to FIG. 12 may be realized by hardware such as a logic circuit.

The invention claimed is:

1. An image processing device comprising:
a processor; and
a memory storing computer-readable instructions which, when executed by the processor, cause the image processing device to:
acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction, the original image data including a text area including K lines of original character strings including the M lines of original character strings, the K being an integer equal to or more than the M, each of the K lines of original character strings being configured by a plurality of characters aligned along the first direction, and the K lines of original character strings being aligned along the second direction, and the original image data including a plurality of pixels configuring the text area includes character pixels and background pixels, the character pixels configuring a character included in the text area, the background pixels configuring a background of the character included in the text area;
combine M items of original character string image data obtained from the original image data so as to create target character string image data, the M items of original character string image data representing the M lines of original character strings, and the target character string image data representing one line of target character string in which the M lines of original character strings are combined linearly along the first direction;
divide the target character string image data so as to create N items of divided character string image data, the N being an integer of 2 or more, and the N items of divided character string image data representing N lines of divided character strings into which the one line of target character string is divided;
create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings,
wherein, to combine the M items of original character string image data so as to create the target character string image data, the computer-readable instructions, when executed by the processor, further cause the image processing device to:
create a first projection histogram using the original image data, the first projection histogram indicating a frequency distribution of the character pixels in a case where each pixel configuring the text area is projected along the first direction;

determine, from within the text area, K items of character string areas including the K lines of original character strings by using the first projection histogram;

create K items of second projection histograms corresponding to the K items of character string areas, each of the K items of second projection histograms indicating a frequency distribution of the character pixels in a case where each pixel configuring one item of character string area corresponding to one item of the second projection histogram is projected along the second direction;

determine the M items of original character string image data as a combining target by using the K items of second projection histograms, the M items of original character string image data representing the M lines of original character strings in the K lines of original character strings included in the text area; and combine the M items of original character string image data determined as the combining target so as to create the target character string image data.

2. The image processing device as in claim 1, wherein in each of the K lines of original character strings, a sentence proceeds from a first side toward a second side of the first direction, and wherein, to determine the M items of original character string image data as the combining target, the computer-readable instructions, when executed by the processor, further cause the image processing device to:

identify, by using the second projection histogram corresponding to an i-th line of character string area in the text area, a first length along the first direction of a front end blank area within the i-th line of character string area, the i being an integer satisfying 2≤i≤K, and the front end blank area being configured by only the background pixels from an end of the first side toward the second side of the first direction;

determine, as the combining target, original character string image data representing an (i−1)-th line of original character string and original character string image data representing an i-th line of original character string, in a case where the first length of the front end blank area of the i-th line of character string area is equal to or smaller than a first threshold value; and not determine, as the combining target, the original character string image data representing the (i−1)-th line of original character string and the original character string image data representing the i-th line of original character string, in a case where the first length of the front end blank area of the i-th line of character string area is greater than the first threshold value.

3. The image processing device as in claim 2, wherein the computer-readable instructions, when executed by the processor, further cause the image processing device to:

determine the first threshold value in accordance with a length along the second direction of the i-th line of character string area.

4. The image processing device as in claim 2, wherein the computer-readable instructions, when executed by the processor, further cause the image processing device to:

combine the original character string image data representing the (i−1)-th line of original character string and the original character string image data representing the i-th line of original character string such that, in a case where the first length of the front end blank area of the i-th line of character string area is equal to or smaller than the first threshold value, regardless of the first length, a blank having a predetermined length is formed between the (i−1)-th line of original character string and the i-th line of original character string.

5. The image processing device as in claim 1, wherein in each of the K lines of original character strings, a sentence proceeds from the first side toward the second side of the first direction, and wherein, to determine the M items of original character string image data as the combining target, the computer-readable instructions, when executed by the processor, further cause the image processing device to:

identify, by using the second projection histogram corresponding to a j-th line of character string area in the text area, a second length along the first direction of a rear end blank area within the j-th line of character string area, the j being an integer satisfying 1≤j≤K−1, and the rear end blank area being configured by only the background pixels from an end of the second side toward the first side of the first direction;

determine, as the combining target, original character string image data representing a j-th line of original character string and original character string image data representing a (j+1)-th line of original character string, in a case where the second length of the rear end blank area of the j-th line of character string area is equal to or smaller than a second threshold value; and not determine, as the combining target, the original character string image data representing the j-th line of original character string and the original character string image data representing the (j+1)-th line of original character string, in a case where the second length of the rear end blank area of the j-th line of character string area is greater than the second threshold value.

6. The image processing device as in claim 5, wherein the computer-readable instructions, when executed by the processor, further cause the image processing device to:

determine the second threshold value in accordance with a length along the second direction of the j-th line of character string area.

7. The image processing device as in claim 5, wherein the computer-readable instructions, when executed by the processor, further cause the image processing device to:

combine the original character string image data representing the j-th line of original character string and the original character string image data representing the (j+1)-th line of original character string such that, in a case where the second length of the rear end blank area of the j-th line of character string area is equal to or smaller than the second threshold value, regardless of the second length, a blank having a predetermined length is formed between the j-th line of original character string and the (j+1)-th line of original character string.

8. The image processing device as claim 1, wherein, to combine the M items of original character string image data so as to create the target character string image data, the computer-readable instructions, when executed by the processor, further cause the image processing device to:

determine, for each of the K items of character string areas, a reference position from among a range of a length along the second direction of one item of character string area; and combine the M items of original character string image data such that M items of reference positions determined for M items of character string areas including the M lines of original character strings are aligned at the same position in the second direction, so as to create the target character string image data.

9. The image processing device as in claim 8, wherein in each of the K lines of original character strings, a sentence proceeds from a first side toward a second side of the second direction, and wherein, to determine the reference position for each of the K items of character string areas, the computer-readable instructions, when executed by the processor, further cause the image processing device to:

determine a plurality of unit areas from among the text area, each of the plurality of unit areas circumscribing a character pixel group in the text area, and each character pixel included in the character pixel group being adjacent to at least one other character pixel;

calculate, for each of the K items of character string areas, a plurality of evaluation values corresponding to a plurality of evaluation ranges in an entire range along the second direction of one item of character string area, each of the plurality of evaluation values being a sum of one or more lengths of one or more specific edges which may be present in a corresponding evaluation range, the specific edge being an edge of the second side in the second direction of the unit area;

identify, for each of the K items of character string areas, a maximum evaluation value among the plurality of evaluation values calculated for one item of character string area; and determine, for each of the K items of character string areas, a specific position along the second direction as the reference position, the specific position being a position within one evaluation range corresponding to the maximum evaluation value.

10. An image processing device comprising:

a processor; and a memory storing computer-readable instructions which, when executed by the processor, cause the image processing device to:

acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction;

combine M items of original character string image data obtained from the original image data so as to create target character string image data, the M items of original character string image data representing the M lines of original character strings, and the target character string image data representing one line of target character string in which the M lines of original character strings are combined linearly along the first direction;

divide the target character string image data so as to create N items of divided character string image data, the N being an integer of 2 or more, and the N items of divided character string image data representing N lines of divided character strings into which the one line of target character string is divided; and create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings, create re-located image data representing the N lines of divided character strings aligned along the second direction by using the N items of divided character string image data, and enlarge the re-located image data so as to create the output image data in which the enlarged N lines of divided character strings are represented.

11. The image processing device as in claim 10, wherein the N is smaller than the M, and the number of characters of the leading line of divided character string among the N lines of divided character strings is greater than the number of characters of the leading line of original character string among the M lines of original character strings.

12. An image processing device comprising:

a processor; and a memory storing computer-readable instructions which, when executed by the processor, cause the image processing device to:

acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction;

combine M items of original character string image data obtained from the original image data so as to create target character string image data, the M items of original character string image data representing the M lines of original character strings, and the target character string image data representing one line of target character string in which the M lines of original character strings are combined linearly along the first direction;

divide the target character string image data so as to create N items of divided character string image data, the N being an integer of 2 or more and being smaller than the M, and the N items of divided character string image data representing N lines of divided character strings into which the one line of target character string is divided; and create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings, wherein the number of characters of the leading line of divided character string among the N lines of divided character strings is greater than the number of characters of the leading line of original character string among the M lines of original character strings.

13. An image processing device comprising:

an acquiring unit configured to acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction;

a combining unit configured to combine M items of original character string image data obtained from the original image data so as to create target character string image data, the M items of original character string image data representing the M lines of original character strings, and the target character string image data representing one line of target character string in which the M lines of original character strings are combined linearly along the first direction;

a dividing unit configured to divide the target character string image data so as to create N items of divided character string image data, the N being an integer of 2 or more, and the N items of divided character string image data representing N lines of divided character strings into which the one line of target character string is divided; and a creating unit configured to create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings, create re-located image data representing the N lines of divided character strings aligned along the second direction by using the N items of divided character string image data, and enlarge the re-located image data so as to create the output image data in which the enlarged N lines of divided character strings are represented.

14. The image processing device as in claim 13, wherein the N is smaller than the M, and the number of characters of the leading line of divided character string among the N lines of divided character strings is greater than the number of characters of the leading line of original character string among the M lines of original character strings.

15. An image processing device comprising:

an acquiring unit configured to acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction;

a combining unit configured to combine M items of original character string image data obtained from the original image data so as to create target character string image data, the M items of original character string image data representing the M lines of original character strings, and the target character string image data representing one line of target character string in which the M lines of original character strings are combined linearly along the first direction;

a dividing unit configured to divide the target character string image data so as to create N items of divided character string image data, the N being an integer of 2 or more and being smaller than the M, and the N items of divided character string image data representing N lines of divided character strings into which the one line of target character string is divided; and a creating unit configured to create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings, wherein the number of characters of the leading line of divided character string among the N lines of divided character strings is greater than the number of characters of the leading line of original character string among the M lines of original character strings.

16. A non-transitory computer-readable recording medium storing computer-readable instructions for an image processing device, the computer-readable instructions, when executed by a processor of the image processing device, causing the image processing device to:

acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction, the original image includes a text area including K lines of original character strings including the M lines of original character strings, the K being an integer equal to or more than the M, each of the K lines of original character strings being configured by a plurality of characters aligned along the first direction, and the K lines of original character strings being aligned along the second direction, wherein a plurality of pixels configuring the text area includes character pixels and background pixels, the character pixels configuring a character included in the text area, the background pixels configuring a background of the character included in the text area;

combine M items of original character string image data obtained from the original image data so as to create target character string image data, the M items of original character string image data representing the M lines of original character strings, and the target character string image data representing one line of target character string in which the M lines of original character strings are combined linearly along the first direction;

divide the target character string image data so as to create N items of divided character string image data, the N being an integer of 2 or more, and the N items of divided character string image data representing N lines of divided character strings into which the one line of target character string is divided; and create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings, wherein, to combine the M items of original character string image data so as to create the target character string image data, the computer-readable instructions, when executed by the processor, further cause the image processing device to:

create a first projection histogram using the original image data, the first projection histogram indicating a frequency distribution of the character pixels in a case where each pixel configuring the text area is projected along the first direction;

determine, from within the text area, K items of character string areas including the K lines of original character strings by using the first projection histogram;

create K items of second projection histograms corresponding to the K items of character string areas, each of the K items of second projection histograms indicating a frequency distribution of the character pixels in a case where each pixel configuring one item of character string area corresponding to one item of the second projection histogram is projected along the second direction;

determine the M items of original character string image data as a combining target by using the K items of second projection histograms, the M items of original character string image data representing the M lines of original character strings in the K lines of original character strings included in the text area; and combine the M items of original character string image data determined as the combining target so as to create the target character string image data.

17. A non-transitory computer-readable recording medium storing computer-readable instructions for an image processing device, the computer-readable instructions, when executed by a processor of the image processing device, causing the image processing device to:

acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction;

combine M items of original character string image data obtained from the original image data so as to create target character string image data, the M items of original character string image data representing the M lines of original character strings, and the target character string image data representing one line of target character string in which the M lines of original character strings are combined linearly along the first direction;

divide the target character string image data so as to create N items of divided character string image data, the N being an integer of 2 or more, and the N items of divided character string image data representing N lines of divided character strings into which the one line of target character string is divided; and create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings, create re-located image data representing the N lines of divided character strings aligned along the second direction by using the N items of divided character string image data, and enlarge the re-located image data so as to create the output image data in which the enlarged N lines of divided character strings are represented.

18. The non-transitory computer-readable recording medium as in claim 17, wherein the N is smaller than the M, and the number of characters of the leading line of divided character string among the N lines of divided character strings is greater than the number of characters of the leading line of original character string among the M lines of original character strings.

19. A non-transitory computer-readable recording medium storing computer-readable instructions for an image processing device, the computer-readable instructions, when executed by a processor of the image processing device, causing the image processing device to:

acquire original image data representing an original image including M lines of original character strings, the M being an integer of 2 or more, each of the M lines of original character strings being configured by a plurality of characters aligned along a first direction, and the M lines of original character strings being aligned along a second direction orthogonal to the first direction;

combine M items of original character string image data obtained from the original image data so as to create target character string image data, the M items of original character string image data representing the M lines of original character strings, and the target character string image data representing one line of target character string in which the M lines of original character strings are combined linearly along the first direction;

divide the target character string image data so as to create N items of divided character string image data, the N being an integer of 2 or more and being smaller than the M, and the N items of divided character string image data representing N lines of divided character strings into which the one line of target character string is divided; and create output image data using the N items of divided character string image data, the output image representing the N lines of divided character strings aligned along the second direction, wherein a number of characters of a leading line of divided character string among the N lines of divided character strings is different from a number of characters of a leading line of original character string among the M lines of original character strings, wherein the number of characters of the leading line of divided character string among the N lines of divided character strings is greater than the number of characters of the leading line of original character string among the M lines of original character strings.

* * * * *